(12) United States Patent
Gu et al.

(10) Patent No.: US 11,229,896 B2
(45) Date of Patent: Jan. 25, 2022

(54) AFFINITY CHROMATOGRAPHY MEDIA AND CHROMATOGRAPHY DEVICES

(71) Applicants: W. R. Grace & Co.-Conn., Columbia, MD (US); Repligen Corporation, Waltham, MA (US)

(72) Inventors: Feng Gu, Ellicott City, MD (US); Surya Kiran Chodavarapu, Ellicott City, MD (US); James Bogdanor, Clarksville, MD (US); Dennis McCreary, Greencastle, MD (US); James Neil Pryor, West Friendship, MD (US); James Rusche, Framingham, MA (US); James Peyser, North Billercia, MA (US); Thomas Pauly, Wiesbaden (DE)

(73) Assignees: W.R. Grace & Co.—CONN., Columbia, MD (US); Repligen Corporation, Waltham, MA (US)

( * ) Notice: Subject to any disclaimer, the term of this patent is extended or adjusted under 35 U.S.C. 154(b) by 62 days.

(21) Appl. No.: 15/111,672

(22) PCT Filed: Jan. 15, 2015

(86) PCT No.: PCT/US2015/011555
§ 371 (c)(1),
(2) Date: Jul. 14, 2016

(87) PCT Pub. No.: WO2015/109068
PCT Pub. Date: Jul. 23, 2015

(65) Prior Publication Data
US 2016/0332142 A1 Nov. 17, 2016

Related U.S. Application Data

(60) Provisional application No. 61/928,242, filed on Jan. 16, 2014.

(51) Int. Cl.
  *B01J 20/286* (2006.01)
  *B01D 15/38* (2006.01)
  (Continued)

(52) U.S. Cl.
  CPC ........ *B01J 20/286* (2013.01); *B01D 15/3809* (2013.01); *B01D 15/3828* (2013.01);
  (Continued)

(58) Field of Classification Search
  CPC ............ B01D 15/3809; B01D 15/3828; B01J 20/28004; B01J 20/28059; B01J 20/28061;
  (Continued)

(56) References Cited

U.S. PATENT DOCUMENTS

| 4,029,583 A | 6/1977 | Ho Chang et al. | 252/184 |
| 4,104,363 A | 8/1978 | Vozka et al. | 423/338 |

(Continued)

FOREIGN PATENT DOCUMENTS

| CA | 1303594 C | 6/1992 |
| CA | 2564413 | 12/2005 |

(Continued)

OTHER PUBLICATIONS

Iler; "The Chemistry of Silica;" (1979), pp. 462-621.
(Continued)

*Primary Examiner* — Latosha Hines
(74) *Attorney, Agent, or Firm* — Foley & Lardner LLP

(57) ABSTRACT

Chromatography media and devices containing chromatography media are disclosed. Methods of making chromatography devices and methods of using chromatography devices containing the chromatography media are also disclosed.

29 Claims, 7 Drawing Sheets

(51) Int. Cl.
*B01J 20/28* (2006.01)
*B01J 20/32* (2006.01)
*B01J 20/289* (2006.01)

(52) U.S. Cl.
CPC ....... *B01J 20/28004* (2013.01); *B01J 20/289* (2013.01); *B01J 20/28059* (2013.01); *B01J 20/28061* (2013.01); *B01J 20/28073* (2013.01); *B01J 20/28085* (2013.01); *B01J 20/28088* (2013.01); *B01J 20/3204* (2013.01); *B01J 20/3219* (2013.01); *B01J 20/3274* (2013.01)

(58) Field of Classification Search
CPC ............ B01J 20/28073; B01J 20/28085; B01J 20/28088; B01J 20/286; B01J 20/289; B01J 20/3204; B01J 20/3219; B01J 20/3274
See application file for complete search history.

(56) References Cited

U.S. PATENT DOCUMENTS

| | | | | |
|---|---|---|---|---|
| 4,118,316 | A | 10/1978 | Talley et al. | 210/31 C |
| 4,157,920 | A | 6/1979 | Wason et al. | 106/292 |
| 4,397,827 | A | 8/1983 | Chu | 423/326 |
| 4,415,631 | A | 11/1983 | Schutijser | |
| 4,517,131 | A | 5/1985 | Helner, Jr. | 260/465 F |
| 4,532,232 | A | 7/1985 | Larsson et al. | |
| 4,576,927 | A | 3/1986 | Kuroda et al. | |
| 4,581,428 | A | 4/1986 | Farnham et al. | 526/190 |
| 4,639,513 | A | 1/1987 | Hou et al. | 530/387 |
| 4,724,207 | A | 2/1988 | Hou et al. | 435/180 |
| 4,732,867 | A | 3/1988 | Obanawa et al. | 502/402 |
| 4,745,097 | A | 5/1988 | Maekawa et al. | 503/209 |
| 4,756,834 | A | 7/1988 | Muller et al. | 210/635 |
| 4,783,264 | A | 11/1988 | Nylen et al. | 210/638 |
| 4,895,806 | A | 1/1990 | Le et al. | 435/288 |
| 4,917,781 | A | 4/1990 | Sharifian et al. | 204/72 |
| 4,956,180 | A | 9/1990 | Cassani et al. | 424/118 |
| 5,030,286 | A | 7/1991 | Crawford et al. | 106/435 |
| 5,035,803 | A | 7/1991 | Cohen | 210/656 |
| 5,057,426 | A | 10/1991 | Karsten et al. | 435/270 |
| 5,059,654 | A | 10/1991 | Hou et al. | |
| 5,099,923 | A | 3/1992 | Aften et al. | 168/294 |
| 5,149,425 | A | 9/1992 | Mazid et al. | 210/198.2 |
| 5,151,350 | A | 9/1992 | Colbert et al. | 435/69.1 |
| 5,152,906 | A | 10/1992 | Aften et al. | 252/8.551 |
| 5,190,660 | A | 3/1993 | Lindoy et al. | 210/670 |
| 5,190,844 | A | 3/1993 | Yabuuchi et al. | 430/137 |
| 5,203,991 | A | 4/1993 | Kutsuna et al. | 210/198.2 |
| 5,230,833 | A | 7/1993 | Romberger et al. | 252/363.5 |
| 5,318,848 | A | 6/1994 | Itoh et al. | 428/405 |
| 5,380,706 | A | 1/1995 | Himes et al. | 507/129 |
| 5,401,809 | A | 3/1995 | Gitzel et al. | 525/337 |
| 5,451,660 | A | 9/1995 | Builder et al. | 530/344 |
| 5,453,186 | A | 9/1995 | Muller et al. | 210/198.2 |
| 5,480,542 | A | 1/1996 | Asakawa et al. | 210/198.2 |
| 5,593,576 | A | 1/1997 | Girot et al. | 210/198.2 |
| 5,593,757 | A | 1/1997 | Kashiwazaki et al. | 428/195 |
| 5,622,743 | A | 4/1997 | Tanaka et al. | |
| 5,701,956 | A | 12/1997 | Hardy et al. | 166/295 |
| 5,805,264 | A | 9/1998 | Janssen et al. | 351/160 R |
| 5,856,379 | A | 1/1999 | Shiratsuchi et al. | |
| 5,906,747 | A | 5/1999 | Coffman et al. | 210/635 |
| 5,914,044 | A | 6/1999 | Lindoy et al. | 210/670 |
| 5,973,068 | A | 10/1999 | Yamaya et al. | |
| 5,976,479 | A | 11/1999 | Alcaraz et al. | 423/335 |
| 6,090,288 | A | 7/2000 | Berglund et al. | |
| 6,127,526 | A | 10/2000 | Blank et al. | 530/413 |
| 6,204,306 | B1 | 3/2001 | Chabrecek et al. | 523/106 |
| 6,372,353 | B2 | 4/2002 | Karger et al. | 428/447 |
| 6,379,500 | B2 | 4/2002 | Greenwood et al. | 162/181.6 |
| 6,383,990 | B1 | 5/2002 | Dawson et al. | 507/209 |
| 6,387,974 | B1 | 5/2002 | Deissler et al. | 521/150 |
| 6,426,315 | B1 | 7/2002 | Bergstrom et al. | 210/661 |
| 6,428,707 | B1 | 8/2002 | Berg et al. | 210/661 |
| 6,435,012 | B2 | 8/2002 | Maikner et al. | 73/61.52 |
| 6,472,486 | B2 | 10/2002 | Klaerner et al. | 526/220 |
| 6,497,964 | B1 | 12/2002 | Matsumura et al. | 428/447 |
| 6,512,060 | B1 | 1/2003 | Matyjaszewski et al. | 526/111 |
| 6,565,905 | B1 | 5/2003 | Ito et al. | 426/330.4 |
| 6,620,326 | B1 | 9/2003 | Lihme et al. | 210/635 |
| 6,624,205 | B2 | 9/2003 | Muranaka | 521/25 |
| 6,649,572 | B2 | 11/2003 | Dawson et al. | 507/209 |
| 6,797,814 | B2 | 9/2004 | Blank | 530/413 |
| 6,802,966 | B2 | 10/2004 | Wormsbecher | 210/198.2 |
| 6,818,259 | B1 | 11/2004 | Koontz | 427/562 |
| 6,852,009 | B2 | 2/2005 | Kawase et al. | 431/35 |
| 6,861,103 | B2 | 3/2005 | Chang et al. | 427/522 |
| 6,916,536 | B1 | 7/2005 | Hammen et al. | 428/407 |
| 6,949,613 | B2 | 9/2005 | Haddleton | 526/90 |
| 6,994,791 | B2 | 2/2006 | Muller et al. | 210/856 |
| 6,994,964 | B1 | 2/2006 | Chang et al. | 435/6 |
| 6,998,042 | B2 | 2/2006 | Wormsbecher | 210/198.2 |
| 7,008,542 | B2 | 3/2006 | Belew et al. | |
| 7,012,044 | B2 | 3/2006 | Dawson et al. | 507/211 |
| 7,067,059 | B2 | 6/2006 | Maloisel | 210/635 |
| 7,128,884 | B2 | 10/2006 | Kirkland et al. | 423/335 |
| 7,166,213 | B2 | 1/2007 | Wormsbecher | 210/198.2 |
| 7,192,560 | B2 | 3/2007 | Parthasarathy et al. | 422/101 |
| 7,198,855 | B2 | 4/2007 | Liebmann-Vinson et al. | 428/447 |
| 7,250,253 | B1 | 7/2007 | Klapproth et al. | 435/6 |
| 7,316,919 | B2 | 1/2008 | Childs et al. | 435/177 |
| 7,323,347 | B2 | 1/2008 | Quinn | 436/518 |
| 7,332,327 | B2 | 2/2008 | Vikholm et al. | 435/287.2 |
| 7,338,768 | B1 | 3/2008 | Trau et al. | 435/7.1 |
| 7,375,168 | B2 | 5/2008 | Zhang et al. | 525/474 |
| 7,378,479 | B2 | 5/2008 | Tamareselvy et al. | 526/333 |
| 7,396,561 | B2 | 7/2008 | Ruhe | 427/214 |
| 7,456,276 | B2 | 11/2008 | Christensen et al. | 536/123.1 |
| 7,560,258 | B2 | 7/2009 | Brueggemeier et al. | 435/174 |
| 7,674,835 | B2 | 3/2010 | Rasmussen et al. | 521/31 |
| 7,683,011 | B2 | 3/2010 | Putzig | 507/273 |
| 7,692,013 | B2 | 4/2010 | Antonini | |
| 7,714,112 | B2 | 5/2010 | Engstrand et al. | 530/390.5 |
| 7,732,383 | B2 | 6/2010 | Putzig | 507/271 |
| 7,736,612 | B2 | 6/2010 | Kubota | 423/335 |
| 7,745,582 | B2 | 6/2010 | Lihme et al. | 530/387.1 |
| 7,754,660 | B2 | 7/2010 | Putzig | 507/271 |
| RE41,595 | E | 8/2010 | Shandle et al. | 210/635 |
| 7,780,946 | B2 | 8/2010 | Wormsbecher et al. | 423/659 |
| 7,790,657 | B2 | 9/2010 | Putzig | 507/273 |
| 7,795,189 | B2 | 9/2010 | Putzig | 507/271 |
| 7,795,190 | B2 | 9/2010 | Putzig | 507/273 |
| 7,851,417 | B2 | 12/2010 | Putzig | 507/271 |
| 7,875,317 | B2 | 1/2011 | Nakagawa et al. | 427/387 |
| 7,943,046 | B2 | 5/2011 | Martosella et al. | 210/635 |
| 7,960,311 | B2 | 6/2011 | Carlson | 506/13 |
| 8,551,894 | B2 | 10/2013 | Seshadri et al. | 442/63 |
| 8,658,277 | B2 | 2/2014 | Wyndham et al. | |
| 8,791,220 | B2 | 7/2014 | Jiang et al. | |
| 2002/0006493 | A1 | 1/2002 | Chabrecek et al. | 428/64.1 |
| 2002/0012982 | A1 | 1/2002 | Blakesley et al. | 435/183 |
| 2002/0028520 | A1 | 3/2002 | Boschetti et al. | 436/518 |
| 2002/0043499 | A1 | 4/2002 | Hammen et al. | 210/656 |
| 2002/0127587 | A1 | 9/2002 | Simms et al. | 435/6 |
| 2003/0017464 | A1 | 1/2003 | Pohl | 435/6 |
| 2003/0075508 | A1 | 4/2003 | Woodruff et al. | 210/583 |
| 2003/0108879 | A1 | 6/2003 | Klaerner et al. | 435/6 |
| 2003/0171443 | A1 | 9/2003 | Erbacher | 521/27 |
| 2003/0225261 | A1 | 12/2003 | Taylor et al. | 535/25.5 |
| 2004/0028901 | A1 | 2/2004 | Rumpf et al. | 428/375 |
| 2004/0058059 | A1 | 3/2004 | Linford | 427/58 |
| 2004/0127648 | A1 | 7/2004 | Guerrer et al. | 525/227 |
| 2004/0203308 | A1 | 10/2004 | Ko et al. | |
| 2004/0211724 | A1 | 10/2004 | Gibson et al. | 210/638 |
| 2004/0224843 | A1 | 11/2004 | Hammen et al. | 502/402 |
| 2005/0100905 | A1 | 5/2005 | Nassoy et al. | 435/6 |
| 2005/0106602 | A1 | 5/2005 | Akhavan-Tafti | 435/6 |
| 2005/0269257 | A1 | 12/2005 | Voute et al. | 210/502.1 |
| 2005/0282294 | A1 | 12/2005 | Britsch | 436/514 |
| 2006/0041035 | A1 | 2/2006 | Poppe et al. | 523/200 |

(56) References Cited

U.S. PATENT DOCUMENTS

| | | | |
|---|---|---|---|
| 2006/0058181 A1 | 3/2006 | Margetts | 502/158 |
| 2006/0144770 A1 | 7/2006 | Granger et al. | 210/198.2 |
| 2006/0180549 A1 | 8/2006 | Liu et al. | 210/656 |
| 2006/0240633 A1 | 10/2006 | Martosella et al. | 438/348 |
| 2007/0112178 A1 | 5/2007 | Johansson et al. | 530/387.1 |
| 2007/0135304 A1 | 6/2007 | Walter et al. | |
| 2007/0141325 A1 | 6/2007 | O'Gara et al. | 428/332 |
| 2007/0178465 A1 | 8/2007 | Sudor et al. | 435/6 |
| 2007/0181482 A1 | 8/2007 | Abudokirim et al. | 210/321.6 |
| 2007/0193954 A1 | 8/2007 | Busson | 210/656 |
| 2007/0276131 A1 | 11/2007 | Ferre et al. | 530/420 |
| 2008/0017579 A1 | 1/2008 | Hermansson et al. | 210/656 |
| 2008/0026486 A1 | 1/2008 | Cooper et al. | 436/518 |
| 2008/0033103 A1 | 2/2008 | Kameda et al. | 524/571 |
| 2008/0038750 A1 | 2/2008 | Piehler et al. | 435/7.1 |
| 2008/0071003 A1 | 3/2008 | Sellergren et al. | |
| 2008/0146454 A1 | 6/2008 | Cuppoletti et al. | 506/6 |
| 2008/0153100 A1 | 6/2008 | Rank et al. | 435/6 |
| 2008/0154029 A1 | 6/2008 | Balayan et al. | 536/25.4 |
| 2008/0164211 A1 | 7/2008 | Lindner et al. | |
| 2008/0210615 A1 | 9/2008 | Joehnck et al. | 210/198.2 |
| 2008/0223764 A1 | 9/2008 | Yamamichi et al. | 210/764 |
| 2008/0236824 A1 | 10/2008 | Putzig | 166/280.1 |
| 2008/0293959 A1 | 11/2008 | Liu et al. | 556/449 |
| 2008/0311681 A1 | 12/2008 | Johannsen et al. | 436/548 |
| 2009/0035876 A1 | 2/2009 | Williams et al. | 436/529 |
| 2009/0048439 A1 | 2/2009 | Weisburg et al. | 536/25.41 |
| 2009/0074709 A1 | 3/2009 | Koepsel et al. | 424/78.32 |
| 2009/0127501 A1 | 5/2009 | Kashima | 252/79.5 |
| 2009/0151946 A1 | 6/2009 | Putzig | 166/280.2 |
| 2009/0151947 A1 | 6/2009 | Putzig | 166/280.2 |
| 2009/0170973 A1 | 7/2009 | Mattiasson et al. | 521/134 |
| 2009/0186093 A1 | 7/2009 | Liu et al. | 424/497 |
| 2009/0232950 A1 | 9/2009 | Brothers, Jr. et al. | |
| 2009/0246885 A1* | 10/2009 | Bian | C07K 16/00 436/501 |
| 2009/0294362 A1 | 12/2009 | Persson et al. | 210/656 |
| 2009/0297853 A1 | 12/2009 | Kirkland et al. | 428/403 |
| 2009/0306292 A1 | 12/2009 | Bendejacq et al. | 525/55 |
| 2009/0308599 A1 | 12/2009 | Dusterhoft et al. | 166/249 |
| 2010/0022419 A1 | 1/2010 | Reed et al. | |
| 2010/0055667 A1 | 3/2010 | Hage et al. | |
| 2010/0099579 A1 | 4/2010 | Chikoti et al. | 506/15 |
| 2010/0129830 A1 | 5/2010 | Deshayes et al. | 435/7.1 |
| 2010/0156135 A1 | 6/2010 | Guckel et al. | 424/9.1 |
| 2010/0159254 A1 | 6/2010 | Oertli et al. | 428/447 |
| 2010/0181254 A1 | 7/2010 | Graalfs | 210/656 |
| 2010/0237019 A1 | 9/2010 | Aldegonda et al. | 210/570 |
| 2010/0310539 A1 | 12/2010 | Garcia-Bennett | |
| 2010/0310865 A1 | 12/2010 | Kumar et al. | 428/352 |
| 2011/0049042 A1 | 3/2011 | DiLeo et al. | 210/490 |
| 2011/0160104 A1* | 6/2011 | Wu | E21B 43/267 507/269 |
| 2011/0201078 A1 | 8/2011 | Rasmussen et al. | |
| 2011/0245077 A1 | 10/2011 | Anderson et al. | 502/402 |
| 2011/0313147 A1 | 12/2011 | Boschetti et al. | 536/56 |
| 2012/0024791 A1* | 2/2012 | Deetz | B01J 41/20 210/656 |
| 2012/0259094 A1 | 10/2012 | Hearn et al. | 530/387.7 |
| 2013/0020523 A1 | 1/2013 | Han et al. | |
| 2013/0041135 A1 | 2/2013 | Tamori et al. | 530/387.1 |
| 2013/0046056 A1* | 2/2013 | Spector | B01J 20/3272 525/54.1 |
| 2013/0056415 A1 | 3/2013 | Kozlov et al. | 210/635 |
| 2013/0109072 A1 | 5/2013 | Tsunoda et al. | |
| 2013/0112623 A1 | 5/2013 | Fernandez-Lahore et al. | |
| 2013/0122215 A1 | 5/2013 | Waller et al. | |
| 2013/0131321 A1 | 5/2013 | Bitterman et al. | |
| 2013/0146542 A1 | 6/2013 | Huang et al. | 210/656 |
| 2013/0178608 A1 | 7/2013 | Kulkarni et al. | |
| 2013/0189322 A1 | 7/2013 | Honeyman et al. | |
| 2013/0193052 A1 | 8/2013 | Witt et al. | |
| 2013/0245139 A1 | 9/2013 | Kozlov et al. | |
| 2013/0274451 A1 | 10/2013 | Bjorkman et al. | |
| 2013/0313187 A1 | 11/2013 | Yin et al. | 210/500.33 |
| 2014/0046023 A1 | 2/2014 | Gottschall et al. | B01J 20/286 |
| 2014/0046029 A1 | 2/2014 | Shannon et al. | C08F 271/02 |

FOREIGN PATENT DOCUMENTS

| | | | |
|---|---|---|---|
| CN | 101381437 | 5/2011 | |
| CN | 102443120 | 3/2013 | |
| CN | 103289030 A | 9/2013 | |
| CN | 102675564 | 4/2014 | |
| DE | 102006012467 | 9/2007 | |
| EP | 0172579 A2 | 2/1986 | |
| EP | 0106769 | 1/1987 | |
| EP | 0263934 | 8/1987 | B01D 15/08 |
| EP | 0545677 | 6/1993 | |
| EP | 0300273 | 3/1994 | |
| EP | 0520109 | 3/1995 | |
| EP | 0463036 | 9/1995 | |
| EP | 0490300 | 3/1998 | |
| EP | 0950067 | 10/1999 | |
| EP | 1229094 | 8/2002 | |
| EP | 1526115 | 4/2005 | C01B 33/12 |
| EP | 1526115 A1 * | 4/2005 | B01J 20/283 |
| EP | 1864999 | 12/2007 | |
| EP | 1897890 | 3/2008 | |
| EP | 1900751 | 3/2008 | |
| EP | 2217646 | 1/2013 | |
| EP | 2352771 | 1/2013 | |
| EP | 2616169 | 7/2013 | |
| EP | 1758671 | 9/2013 | |
| JP | S5226386 A | 2/1977 | |
| JP | 59050052 | 3/1984 | |
| JP | 59050054 | 3/1984 | |
| JP | S59500656 A | 4/1984 | |
| JP | S64086868 A | 3/1989 | |
| JP | H02142798 A | 5/1990 | |
| JP | 06016738 A | 1/1994 | |
| JP | 6281638 | 10/1994 | B01J 20/281 |
| JP | 8134138 | 5/1996 | |
| JP | 2001521507 A | 11/2001 | |
| JP | 2003526796 A | 9/2003 | |
| JP | 2008012460 A | 1/2008 | |
| JP | 2009031277 A | 2/2009 | |
| JP | 2009126948 A | 6/2009 | |
| JP | 2011001336 | 1/2011 | C07K 17/14 |
| JP | 2011523624 A | 8/2011 | |
| JP | 2012012334 | 1/2012 | C07K 17/14 |
| JP | 2012032390 A | 2/2012 | |
| JP | 2012042477 A | 3/2012 | |
| JP | 2012086221 A | 5/2012 | |
| JP | 2012139678 A | 7/2012 | |
| JP | 2012254981 A | 12/2012 | |
| JP | 2013510918 | 3/2013 | |
| WO | 8303776 A1 | 11/1983 | |
| WO | 8400773 | 3/1984 | C12N 15/00 |
| WO | 1990009237 | 8/1990 | B01J 20/32 |
| WO | WO-9009237 A1 * | 8/1990 | B01J 20/3257 |
| WO | 9400237 | 1/1994 | |
| WO | 9403268 | 2/1994 | |
| WO | 9525789 | 9/1995 | |
| WO | 9705174 | 2/1997 | |
| WO | 9831461 | 7/1998 | |
| WO | 0102452 | 1/2001 | |
| WO | 0188520 | 11/2001 | |
| WO | 0228912 | 4/2002 | |
| WO | 02074791 | 9/2002 | C07K 1/20 |
| WO | 03031580 | 4/2003 | |
| WO | 03049671 | 6/2003 | |
| WO | 2004009677 | 1/2004 | |
| WO | 2004024318 | 3/2004 | |
| WO | 2004076511 | 9/2004 | |
| WO | 2005005548 A1 | 1/2005 | |
| WO | 2006110314 | 10/2006 | |
| WO | 2008027262 | 3/2008 | |
| WO | 2008140652 | 11/2008 | |
| WO | 2008147717 | 12/2008 | B01J 20/288 |
| WO | 2009053317 | 4/2009 | |
| WO | 2009079325 | 6/2009 | |
| WO | 2009102207 | 8/2009 | B01J 20/283 |

(56) References Cited

FOREIGN PATENT DOCUMENTS

| | | | | |
|---|---|---|---|---|
| WO | 2009150402 | 12/2009 | | |
| WO | 2010027955 | 3/2010 | | |
| WO | 2011012302 | 2/2011 | ............... | B01J 20/32 |
| WO | 2011025867 | 3/2011 | | |
| WO | 2011072873 | 6/2011 | ................ | C07K 1/22 |
| WO | 2012087231 | 6/2012 | ............. | B01D 15/38 |
| WO | 2013004587 | 1/2013 | | |
| WO | 2013007793 | 1/2013 | | |
| WO | 2013062105 | 5/2013 | ............ | C01B 33/193 |
| WO | 2013089477 | 6/2013 | | |
| WO | 2013162449 A1 | 10/2013 | | |
| WO | 2014043644 A1 | 3/2014 | | |
| WO | 2014058570 A1 | 4/2014 | | |

OTHER PUBLICATIONS

Jandera, Pavel, "Stationary phases for hydrophilic interaction chromatography, their characterization and implementation into multi-dimensional chromatography concepts." Journal of Separation Science, v 31, n 9, p. 1421-1437, May 2008, Hydrophilic interaction chromatography; ISSN: 16159306, E-ISSN: 16159314; DOI: 10.1002/jssc.200800051 Publisher: Wiley-VCH Verlag.

Bruno, G.; Gasparrini, F.; Misiti, D.; Arrigoni-Martelli, E.; Bronzetti, M. "High-performance liquid chromatographic separation of biomolecules using calcium phosphate supported on macroporous silica microparticles", Journal of Chromatography, v 504, n 2, p. 319-333, 1990; ISSN: 00219673 Publisher: Elsevier.

Vuignier, Karine; Fekete, Szabolcs; Carrupt, Pierre-Alain; Veuthey, Jean-Luc; Guillarme, Davy, "Comparison of Various Silica-Based Monoliths for the Analysis of Large Biomolecules", Journal of Separation Science, v 36, n 14, p. 2231-2243, Jul. 2013; ISSN: 16159306, E-ISSN: 16159314; DOI: 10.1002/jssc.201300323; Publisher: Wiley-VCH Verlag.

Manda, Keerthini "Synthesis and characterization of protein bonded stationary phases for HPAC.", Source: Dissertations & Theses, 2007. vol. 46, Issue 1, Publication / order No. AAI1445247; http://search.proquest.com/docview/33934537?accountid=142944.

Schmidt, D.E.; Giese, R.W.; Conran, D.; Karger, B.L., "High performance liquid chromatography of proteins on a diol-bonded silica gel stationary phase", Analytical Chemistry, v 52, n 1, 177-82, Jan. 1980; ISSN: 0003-2700; Country of publication: USA. Publisher: American Chemical Society.

Yoshinaga, Kohji; Kondo, Akihiko; Higashitani, Ko; Kito, Taketoshi, "Immobilization of Protein On Monodispersed Colloidal Silica with Poly(Ethylene Glycol) Spacer and Application of the Composites to Immunological Agglutination Tests", Colloids and Surfaces A: Physicochemical and Engineering Aspects, v 77, n 2, p. 101-107, Sep. 17, 1993; ISSN: 09277757; DOI: 10.1016/0927-7757(93)80106-O.

Katoh, Shigeo; Imada, Masami; Takeda, Naoki; Katsuda, Tomohlsa; Miyahara, Hiroyoshi; Inoue, Masaki; Nakamura, Shuji, "Optimization of silica-based media for antibody purification by protein A affinity chromatography", Journal of Chromatography A, v 1161, n 1-2, p. 36-40, Aug. 17, 2007, 26th International Symposium on the Separation of Proteins, Peptides and Polynucleotides; ISSN: 00219673; DOI: 10.1016/j.chroma.2007.04.023; Publisher: Elsevier.

Emara, Samy; Masujima, Tsutomu; Hadad, Ghada; Kamal, Maha; Zaazaa, Hala; Kawi, Mohamed Abdel, "A Rapid, Sensitive, and Environmentally Friendly On-Line Solid Phase Extraction Using Protein-Coated μ-Bondapak Cyanide Silica Precolumn for Chromatographic Determination of Paracetamol in Human Serum.", Journal of Liquid Chromatography and Related Technologies, v 36, n 10, p. 1297-1311, Apr. 1, 2013; ISSN: 10826076, E-ISSN: 1520572X; DOI: 10.1080/10826076.2012.686139; Publisher: Taylor and Francis Inc.

Hatch, R.G., "Chromatography of Proteins On a Silica-Based Support with Polyethylene Glycol Ligands", Journal of Chromatographic Science, v 28, n 4, p. 210-214, Apr. 1990; ISSN: 00219665.

Massom, L R; Ulbright, C; Snodgrass, P; Jarrett, H W, "Protein A-silica: Purification of Antibodies and Antigen/Antibody Complexes by High Pressure Affinity Chromatography", Biochromatography 4.3 (1989): 144-148; http://search.proquest.com/docview/15419101?accountid=142944.

Wei, Bingchuan, "Silica colloidal crystals for ultra-efficient protein separations", Dissertations & Theses, Purdue University, ProQuest, UMI Dissertations Publishing, 2011. 3506193; ISBN 9781267315243; http://search.proquest.com/docview/1014174524?accountid=142944 Publisher: UMI Dissertations Publishing 2011.

Ohlson S, Wieslander J, "High-Performance Liquid Affinity Chromatographic Separation of Mouse Monoclonal Antibodies with Protein A Silica.", J Chromatogr. Jun. 26, 1987;397:207-12; Publisher: Elsevier.

Narayanan, S.; Crane S., "Affinity Chromatography Supports: A Look at Performance Requirements", Trends in Biotechnology, vol. 8, 1990, pp. 12-16; DOI: 10.1016/0167-7799(90)90124-G; Publisher: Elsevier.

McCue, Justin T.; Kemp, Glen; Low, Duncan; Quiniones-Garcia, Igor, "Evaluation of protein-A chromatography media", Science Direct_Journal of Chromatography A, 989 (2003) 139-153.

Katoh, Shigeo et al. "Affinity Purification of Antibodies: Optimisation Strategies of Protein A-Coupled Silica Media", G.I.T. Laboratory Journal 5-6/2007 p. 26-27.

Miyahara, H; Nakashima, R; Inoue, M; Katsuda, T; Yamaji, H. Katoh, S; "Optimization and Performance of Silica-Based Media for Industrial-Scale Antibody Purification" Chemical Engineering & Technology (2012), 35, No. 1, 157-160. Publisher: Wiley-VCH Verlag.

Boyle, M.D.P.; Reis, K.J. "Bacterial Fc Receptors", Nature Biotechnology 5, p. 697-703 (1987).

Brunauer, Stephen, Emmett, P.H., Teller, Edward "Adsorption of Gases in Multimolecular Layers" Journal of American Chemical Soceity, 60, p. 309-319 (1938).

Roy, Asit; Roy, Sujata, "Preparation of a high flow packing material (silica based) for high performance affinity chromatography of proteins." Affinity Chromatography and Biological Recognition, 1983, AMF Speciality Materials Group Meriden, Connecticut, USA, ISBN 0-12-166580-1. Publisher: Academic Press, Inc.

Katoh, Shigeo, "Affinity chromatography for large-scale purification of antibody pharmaceuticals", Biotechnology-based drug manufacturing technology series, Pharm Tech Japan, v 27. No. 11, 2011.

PCT Search Report and Written Opinion for PCT/US2015/11555; dated Apr. 23, 2015.

Bach, Long Giang; Islam, Md. Rafiqul; Jeong, Yean Tae; Hwang, Ha Sao; Lim, Kwon Taek, "A Facile Synthesis of PMMA-SiO2 Nanocomposites via Surface Initiated Radical Polymerization", Molecular Crystals and Liquid Crystals, 565(1), 78-87 (2012).

Banerjee, Jaya; Kumar, Rajesh; Srivastava, Abhishek; Behari, Kunj, "Graft Copolymerization of 2-Acrylamido-2-Methyl-1-Propanesulfonic Acid onto Carboxymethylcellulose (Sodium Salt) Using Bromate/Thiourea Redox Pair", Journal of Applied Polymer Science, 100(1), 26-34 (2006).

Binghe Gu, Yun Li and Lee, Milton L., "Polymer Monoliths with Low Hydrophobicity for Strong Cation-Exchange Capillary Liquid Chromatography of Peptides and Proteins", Analytical Chemistry, v79, n 15, p. 5848-5855 (2007).

Bowes, Brian D., "Protein Transport and Adsorption in Polymer-Modified Ion-Exchange Media", University of Delaware, ProQuest Dissertations Publishing (2011).

Breadmore, Michael C.; Shrinivasan, Sushil; Karlinsey, James; Ferrance, Jerome P.; Norris, Pamela M.; Landers, James P. "Towards a Microchip-Based Chromatographic Platform. Part 2: Sol-Gel Phases Modified with Polyelectrolyte Multilayers for Capillary Electrochromatography", Electrophoresis, v 24, p. 1261-1270 (2003).

Buess-Herman, Claudine et al. "Hydration of a Polysulfone Anion-Exchange Membrane Studied by Vibrational Spectroscopy," Langmuir, vol. 19, No. 8 (2003).

Capito, Florian; Bauer, Johann: Rapp, Almut; Schroter, Christian; Kalmar, Harald; Stanislawski, Bernd, "Feasibility Study of Semi-Selective Protein Precipitation with Salt-Tolerant Copolymers for Industrial Purification of Therapeutic Antibodies", Biotechnology and Bioengineering, v 110, n 11, p. 2915-2927 (2013).

(56) References Cited

OTHER PUBLICATIONS

Carrot, Geraldine; Perez, Henri, "Controlled Surface Initiated Polymerizations from Inorganic Nanoparticles", Polymer Preprints (American Chemical Society, Division of Polymer Chemistry), 47(2), 827-828 (2006).
Chen, Xin; Tolley, H. Dennis; Lee, Milton L., "Polymeric Cation-Exchange Monolithic Columns Containing Phosphoric Acid Functional Groups for Capillary Liquid Chromatography of Peptides and Proteins", Journal of Chromatography A, v 1217, n 24, p. 3844-3854 (2010).
Dhar, P.; Vatansever. F.; Seery, "Modification of Silica Surfaces Using Surface Initiated Polymerization", Book of Abstracts, 215th ACS National Meeting, Dallas, Mar. 29-Apr. 2, PMSE-147 (1998).
Dyer, Daniel J.; Zhao, Tongfeng; Green, John-Bruce, "Surface Initiated Photopolymerization from Gold", Polymer Preprints (American Chemical Society, Division of Polymer Chemistry), 42(2) (2001).
Guo, Hui, "Development of Chromatofocusing Techniques Employing Mixed-Mode Column Packings for Biomolecule Separations", Dissertations & Theses, University of Maryland, Baltimore County, ProQuest, UMI Dissertations Publishing (2014).
Hernstrom, Petrus et al. "Atom-Transfer Radical Graft Polymerization Initiated Directly from Silica Applied to Functionalization of Stationary Phases for High-Performance Liquid Chromatography in the Hydrophilic Interaction Chromatography Mode," Analytical Chemistry, 78 (2006), pp. 7098-7103.
Huang, Meiyu; Wu, Ru, "Polymerization of Acrylic Acid Initiated by Poly(y-mercaptopropylsiloxane-lanthanide) Complexes", Ziran Zazhi, 5(12), 950-1 (1982).
Kuroda, Hirofumi; Nakatsuchi, Sayaka; Kitao, Nobuyoshi; Nakagawa, Tsuyoshi; "Radical polymerization of Methacrylates Having Moiety Activated by Electron-Withdrawing Group as a Reactive Functional Group" Relative & Functional Polymers, v 66, p. 229-238 (2006).
Liu, Shu-juan; Dun, Hui-juan; Zhou, Feng; Zhao, Liang; Liu, Xia; Jiang, Sheng-xiang, "Preparation of Polymer Modified Stationary Phases through Surface Radical Chain Transfer Reaction" Sepu, 20(5), 432-435 (2002).
Liu, Shu-juan; Zhou, Feng; Jiang, Sheng-xiang; Liu, Wei-min, "Characterization of Polymer Brushes on Nanoparticle Surfaces" Gaofenzi Cailiao Kexue Yu Gongcheng, 19(6), 65-68 (2003).
Liu, Shu-juan; Zhou, Feng; Jiang, Sheng-xiang; Liu, Wei-min, "Preparation of Stationary Phase for HPLC Through Surface-Initiated Polymerization" Gaofenzi Cailiao Kexue Yu Gongcheng, 19(6), 65-68 (2003).
Ma, Z et al. "Synthesis of Magnetic Chelator for High-Capacity Immobilized Metal Affinity Adsorption of Protein by Cerium Initiated Graft Polymerization." Langmuir, vol. 21, No. 15 (2005).
Maiti, Sukumar; Palit, Santi "Thiols as Redox Initiator for Vinyl Polymerization" Journal of Polymer Science: Polymer Chemistry, v 9, n 1, p. 253-256 (1971).
Mihai, M.; Schwarz, S.; Janke, A; Ghiorghia, C.A.; Dragan, E.S., "Silica Microparticles Surface Coating by Layer-by-Layer or Polyelectrolyte Complex Adsorption", Periodical: Journal of Polymer Research, v 20, n 2, 89 (2013).
Min, Jun Ho; Min, Seong Kee, "The Characteristics of Poly(acrylamide)-SiOx Nanoparticles Prepared by Graft-Polymerization", Periodical: Kongop Hwahak, 21(1), 34-39 (2010).
Moon, Jung-Min et al. "Modification of Monodisperse Colloidal Silica by Radical Copolymerization of Cationic Surface Active Vinyl Monomers," Polymer Journal, vol. 41, No. 3 (2009), pp. 208-213.
Mori, Hideharu et al. "Controlled Radical Polymerization of an Acrylamide Containing I-Phenylalanine Moiety via RAFT." Macromolecules, No. 38, p. 9055-9065 (2005).
Murofushi, Katsumi, "Additive for Increase in Hardness and Adhesiveness of Photocurable Resin", Periodical: Purasuchikkusu, 57(9), 37-40 (2006).
Okaya, Takuji; Kikuchi, Kanji; Morii, Yukiko "Polymerization of Acrylamide in Aqueous Medium Initiated with a Redox System Composed of Cysteine and Potassium Bromate" Macromolecular Chemistry and Physics, v 198, p. 2027-2034 (1997).
Park, Mi•kyoung; Sakellariou, George; Pispas, Stergios; Hadjichristides, Nikos; Mays, Jimmy; Advincula, Rigoberto, "Living Anionic Surface Initiated Polymerization (LASIP): Synthesis and Characterization of Block Copolymers", Periodical: Abstracts of Papers, 223rd ACS National Meeting, Orlando, FL, United States, Apr. 7-11, 2002.
Prucker, Oswald; Habicht, Jorg; Park, In-Jun; Ruhe, Jurgen, "Photochemical Strategies for the Preparation, Micropatterning and Modification of Polymer Brushes", Periodical: Polymer Preprints (American Chemical Society, Division of Polymer Chemistry), 44(1), 470-471 (2003).
Rashid, Harun-Or; Lee, Won-Ki; Hong, Seong-Soo; Park, Jong Myung; Kim, Hyun Gyu; Um, Kwon Taek "Polymer Brushes on Carbon Nanotubes by Thioi-Lactam Initiated Radical Polymerization of 2-Hydroxyethyl Methacrylate", Journal of Nanoscience and Nanotechnology, v 12, p. 840-846 (2012).
Salarizadeh, Parisa; Javanbakht. Mehran; Abdollahi, Mahdi; Naji, Leila, "Preparation, Characterization and Properties of Proton Exchange Nanocomposite Membranes Based On Poly(Vinyl Alcohol) and Poly(Sulfonic Acid)-Grafted Silica Nanoparticles" International Journal of Hydrogen Energy, v 38, n 13 (2013).
Savina, Irina et al. "Anion-Exchange Supermacroporous Monolithic Matrices with Grafted Polymer Brushes of N,N-Dirnethylaminoethyi-Methacrylate," Journal of Chromatography A, vol. 1092, No. 2 (2005).
Savina, Irina et al. "ion-Exchange Macroporous Hydrophilic Gel Monolith with Grafted Polymer Brushes." J. Mol. Recognit., vol. 19, No. 4 (2006).
Shimomura, Masato; Kikuchi, Hiroaki; Matsumoto, Hiroshi; Yamauchi, Takeshi; Miyauchi, Shinnosuke "Attaching of Poly(acrylic acid) to Inorganic Surface and its Application to Enzyme Immobilization" Polymer Journal, v 27, n 9, p. 974-977 (1995).
Shukla, J.S.; Singh, Khajan "Aqueous Polymerization of Acrylamide", Journal of Polymer Science: Polymer Chemistry Edition, vol. 17, 531-538 (1979).
Srivastava, Arti; Behari, Kunj, "Graft Copolymerization of 2-Acrylamido-2-Methyi-1-Propane Sulphonic Acid onto Xanthan Gum by Ascorbic / Bromate Redox Pair" PMSE Preprints, 90, 698-699 (2004).
Terada et. al., Synthesis of block copolymer comprising polyvinylalcohol as one of components and Properties thereof, Polymer Articles, Japan, Nov. 1992, vol. 49, No. 11, p. 885-891.
Tessrkmen, Deniz et al. "Synthesis of Tentacle-Type Magnetic Beads as Immobilized Metal-Chelate Affinity Support for Cytochrome C Adsorption," Int. J. Bioi. Macromol., vol. 38, No. 2 (2006).
Tsuneda, Setal. "Biding of Lysozyme onto a Cation-Exchange Microporous Membrane Containing Tentacle-Type Grafted Polymer Branches," Biotechnol Prog., vol. 10, No. 1 (1994).
Wang, Xiao-hua; Gao, Bao-jlao; Wang, Ming-juan; Fang, Xiao-lin, "Realizing Highly Effective Graft-Polymerization of Acrylonitrile on Surfaces of Silica Gel Particles by Constructing Mercapto Group-Cerium (IV) Salt Redox Initiation System" Gaofenzi Xuebao, (3), 256-263 (2012).
Xu, Liang et al. "Fabrication and Characterization of Open-Tubular CEC Modified with Tentacle-Type Metal Chelating Polymer Chains," Electrophoresis, vol. 28, No. 11 (2007).
Xu, Liang et al. "Novel Negatively Charged Tentacle-Type Polymer Coating for On-Line Preconcentration of Proteins in CE." Electrophoresis, vol. 30, No. 4 (2009).
Xu, Liang et al. "Novel Open Tubular CEC with Tentacle-Type Polymer Stationary Phase Functionalized by Phenylalanine." Electrophoresis, vol. 29, No. 4 (2008).
Yanase, Tomohiro et al. "Regeneration Technology of Tetramethylammonium Hydroxide Using ton Exchange Resin." Technology Reports of Kansai University, No. 47 (2005).
Zhang, Jian et al. "Capillary Electrochromatography of Peptides on a Column Packed with Tentacular Weak Cation-Exchanger Particles," Journal of Chromatography A, 953 (2002), pp. 239-249.

(56) References Cited

OTHER PUBLICATIONS

Zhang, Wenjun; Hu, Baoan; Zhang, Yan; Su, Hui; Xiao, Min, "Preparation of Novel Amphiphilic Polymeric Flocculant by Dispersion Polymerization Method", Huaxue Gongcheng, 37(2), 67-70 (2009).
Ihara, Hirotaka, "Functional Design and Development of High Selectivity in Polymer-Coated Silica", $14^{th}$ Adsorption Symposium, Lecture Abstract, Japan, 2003, p. 1-7.
Terada K., et al., Syntheses and Properties of Block Copolymers Having Poly (vinyl alcohol) as One Component, Japanese Journal of Polymer Science and Technology, Japan, Nov. 1992, vol.49, No. 11, p. 885-891.
Koizumi K., Separation and Analysis of Carbohydrates, Journal of Applied Glycoscience, 1994, vol.41, No. 4, p. 465-471.
Hara H., Functional Design of Polymer-coated Silica and Its High Selectivity, Abstracts from the 14th Symposium on Adsorption, Japan, Aug. 2003, p. 1-7.
Patent Application No. JP 2016-565107 Office Action dated Nov. 1, 2019.
Patent Application No. JP 2017-510439 Office Action dated Mar. 5, 2020.
Patent Application No. 201580036306.5 English translation of First Office Action and Search Report dated Jan. 19, 2020.

\* cited by examiner

Scheme 1

Hg Pore Size Distribution Data for 1000 Å Median Pore size

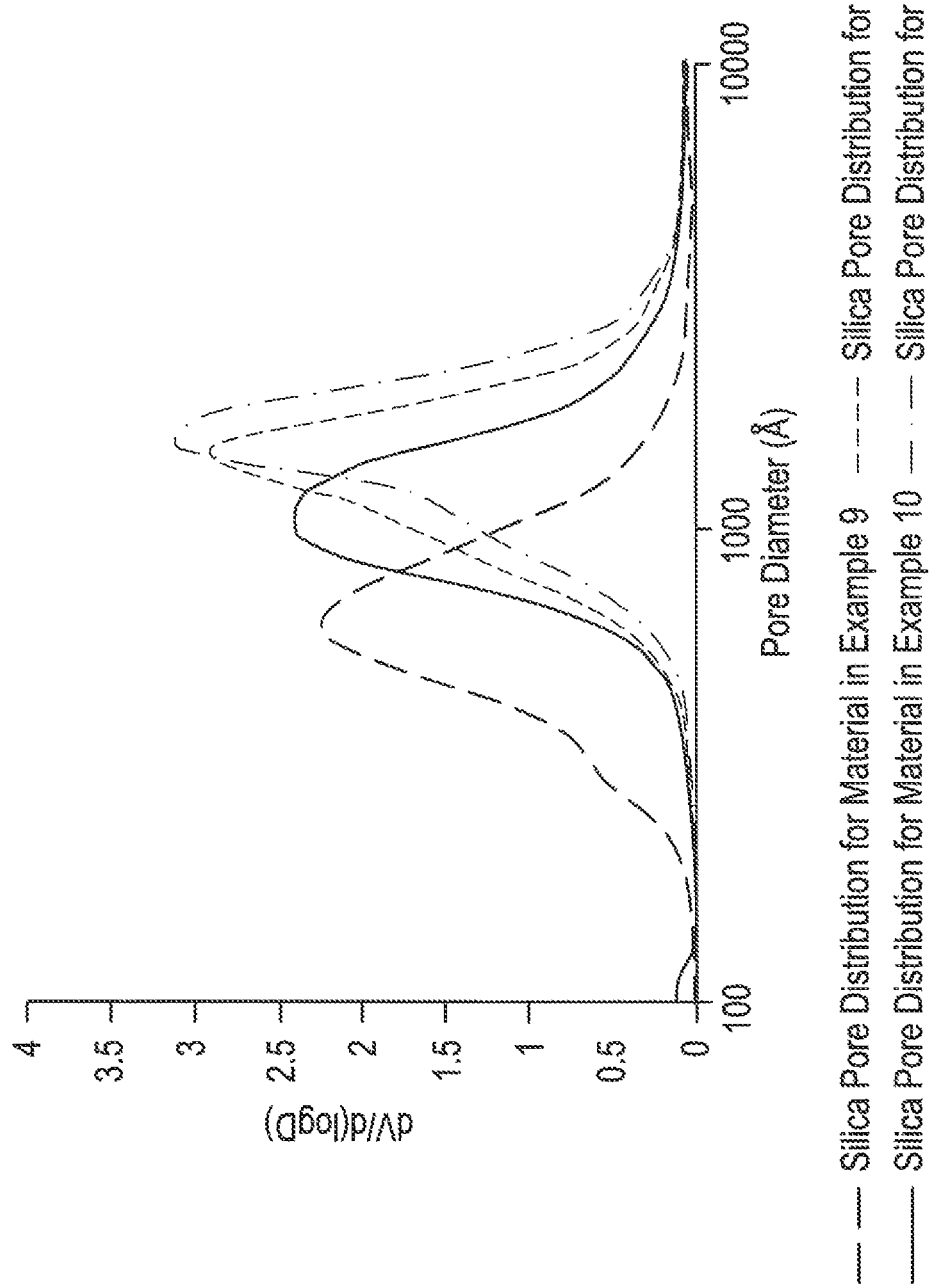

AFFINITY CHROMATOGRAPHY MEDIA AND CHROMATOGRAPHY DEVICES

FIELD OF THE INVENTION

The present invention is directed to chromatography media and chromatography devices containing chromatography media, methods of making chromatography devices, and methods of using chromatography devices.

BACKGROUND OF THE INVENTION

Affinity chromatography media generally comprises a solid support having a bound ligand capable of interacting with a target molecule or molecules. Affinity chromatography is useful because the ligands deployed on solid supports, such as beads, are typically selective for the target molecule. This selectivity allows for good yield, as well as fast and economical purification of target molecules.

Protein A of *Staphylococcus aureaus*, or the recombinant protein A having specific affinity to immunoglobulins, is a selective affinity ligand which binds most sub-classes of immunoglobulins (e.g., IgG), including monoclonal antibodies (mAbs). Boyle, M. D. P. and Reis, K. J., 1987, Biotechnology, 5: 697. Once immobilized onto a porous chromatography support such as a resin, membrane or other media, Protein A is useful for purification and commercial production of mAbs or polyclonal IgG.

Performance of an affinity chromatography media may be determined by such factors as selectivity, effective mass transfer, binding capacity and packed bed permeability selectivity of the support. Optimization of such performance characteristics are determined by a combination and interplay of the base matrix properties, type of chemical modification used for ligand attachment and ligand properties.

The most commonly used media supports are polymers of carbohydrates such as beaded agarose. These materials exhibit low non-specific protein binding; however, they are soft and compressible, and therefore, limited in use on a large scale. Silica based solid supports do not suffer from many of the shortcomings associated with agarose or other types of polymeric supports.

Affinity media based on porous silica, e.g. controlled pore glass (CPG), have found some commercial utility due to their high capacity and suitable pressure-flow characteristics. In McCue et. al., 2003, Journal of Chromatography A, 989(1):139, controlled pore glass beads (56 to 100 μm particle sizes) of two different pore sizes: 700 Å and 1000 Å were used for protein A affinity media solid support. They found that larger static and dynamic capacities were achieved with the smaller, 700 Å pore size material, and this was rationalized as a result of the larger surface area and associated higher ligand concentrations on the surface. Notably, it was a common belief that porous silica based supports require a uniform pore size over a narrow pore size distribution. For example, Roberts et al (WO199009237) claimed that porous glass with uniform pore size (i.e., the pore size distribution falls within a narrow range-90% of all pores having a diameter ±10% from the mean) is preferred for affinity support media, Copan (EP0263934) also defined narrow pore size range for its materials. Silica gels having undefined and broad pore size distribution were generally considered unsatisfactory as supports for affinity media.

There is a need in the art to increase productivity and process efficiency in affinity chromatography media and chromatographic operations for the purification and production of biopolymers.

SUMMARY OF THE INVENTION

It has now been unexpectedly discovered that an a Protein A based affinity chromatography media which comprises a porous inorganic oxide support having a specified pore size distribution and breath, in combination with a specified linker density possess enhanced Protein A dynamic binding capacity for monoclonal antibodies (e.g. IgG1) and good selectivity, i.e. low non-specific protein binding for undesired proteins. In particularly, it was found that a silica based support having a non-uniform pore size over a broad pore size distribution provided an affinity media having a comparable Protein A dynamic binding capacity performance to prior known Protein A affinity media comprising a controlled pore glass support having a smaller particle size and a narrow pore size distribution. Advantageously, the affinity media of the invention provide high binding capacity for monoclonal antibodies with low non-specific protein binding while minimizing problems associated with back pressure when used in a chromatography column.

Accordingly, the present invention provides improved silica based chromatography media and chromatography devices containing such chromatography media. The disclosed chromatography devices enable a more efficient, productive and/or environmentally friendly chromatographic operation due to one or more of the following advantages over conventional chromatographic operations: elimination of a device packing step by the user; elimination of clean-in-place (CIP) steps; elimination of clean-in-place (CIP) steps utilizing sodium hydroxide solution; elimination of any validation steps by the user; and use of a chromatography device comprising biodegradable material.

In one exemplary embodiment, the chromatography media of the present invention comprises porous inorganic particles having a median pore diameter of from about 600 Angstroms (Å) to about 1600 Å; a pore size distribution relative span of at least about 0.75; and a functionalized surface comprising an average of from greater than 1.0 to about 3.0 linker molecules per square nanometer of surface area of said porous inorganic particles.

In another exemplary embodiment, the chromatography media of the present invention comprises porous inorganic particles having a median pore diameter of from about 600 Å to about 1600 Å; a pore size distribution relative span of at least about 0.75; and a functionalized surface comprising a protein covalently bonded to surface portions of said porous inorganic particles, said protein having a molecular weight ranging from about 10,000 to about 100,000 Dalton (D).

In another exemplary embodiment, the chromatography media of the present invention comprises porous inorganic particles having an average BET surface area of from about 20 $m^2/g$ to about 100 $m^2/g$; an average pore volume of at least about 1 ml/g; a pore size distribution relative span of at least about 0.75; a functionalized surface comprising an average of from greater than 1.0 to about 3.0 linker molecules per square nanometer of surface area of said porous inorganic particles; and a protein covalently bonded to at least some of said linker molecules, said protein having a molecular weight ranging from about 10,000 to about 100,000 D.

The present invention is also directed to methods of making chromatography media or support. In one exemplary method, the method of making chromatography media comprises forming porous inorganic particles, wherein the porous inorganic particles have a median pore diameter of from about 600 Å to about 1600 Å, and a pore size distribution relative span of at least about 0.75; and reacting surface portions of the porous inorganic particles with at least one reactant so as to form a functionalized surface comprising an average of from greater than about 1 to about 3 linker molecules per square nanometer of surface area of the porous inorganic particles. In another exemplary method, the method of making chromatography media comprises forming porous inorganic particles, wherein the porous inorganic particles have a median pore diameter of from about 600 Å to about 1600 Å, and a pore size distribution relative span of at least about 0.75; and reacting surface portions of the porous inorganic particles with at least one reactant so as to form a functionalized surface comprising a protein covalently bonded to surface portions of said porous inorganic particles, said protein having a molecular weight ranging from about 10,000 to about 100,000 D. In another exemplary method, the method of making chromatography media comprises forming porous inorganic particles, wherein the porous inorganic particles have an average BET surface area of from about 20 $m^2/g$ to about 100 $m^2/g$, an average pore volume of at least about 1 ml/g, and a pore size distribution relative span of at least about 075; and reacting surface portions of the porous inorganic particles with at least one reactant so as to form a functionalized surface comprising an average of from greater than about 1 to about 3 linker molecules per square nanometer of surface area of said porous inorganic particles; and a protein covalently bonded to at least some of said linker molecules, said protein having a molecular weight ranging from about 10,000 to about 100,000 D.

The present invention is further directed to chromatography devices comprise a device housing; and chromatography media positioned within the device housing. In one embodiment, the chromatography device comprises a device housing; and chromatography media positioned within the device housing, wherein the chromatography media comprises porous inorganic particles having a median pore diameter of from about 600 Å to about 1600 Å; a pore size distribution relative span of at least about 0.75; and a functionalized surface comprising an average of from greater than about 1 to about 3 linker molecules per square nanometer of surface area of said porous inorganic particles.

In another exemplary embodiment, the chromatography device comprises a device housing: and chromatography media positioned within the device housing, wherein the chromatography media comprises porous inorganic particles having a median pore diameter of from about 600 Å to about 1600 Å; a pore size distribution relative span of at least about 0.75; and a functionalized surface comprising a protein covalently bonded to surface portions of said porous inorganic particles, said protein having a molecular weight ranging from about 10,000 to about 100,000 D.

In yet another exemplary embodiment, the chromatography device comprises a device housing; and chromatography media positioned within the device housing, wherein the chromatography media comprises porous inorganic particles having an average BET surface area of from about 20 $m^2/g$ to about 100 $m^2/g$; an average pore volume of at least about 1 ml/g; a pore size distribution relative span of at least about 0.75; a functionalized surface comprising an average of from greater than about 1 to about 3 linker molecules per square nanometer of surface area of said porous inorganic particles; and a protein covalently bonded to at least some of said linker molecules, said protein having a molecular weight ranging from about 10,000 to about 100,000 D.

The present invention is even further directed to methods of making chromatography devices. In one exemplary method, the method of making a chromatography device comprises incorporating any of the herein-described chromatography media into a device housing. In some methods of making a chromatography device, the method comprises incorporating chromatography media into a column housing formed from a polymeric material, a metal material, a glass material, a ceramic material, or a composite thereof, and in some embodiments, a biodegradable polymeric material.

The present invention is even further directed to methods of using any of the herein-described chromatography media and chromatography devices. In one exemplary method of using chromatography media and chromatography devices, the method comprises positioning chromatography media and/or a chromatography device of the present invention within an operating position of a chromatography system; and processing a fluid through the chromatography media or the chromatography device. In some embodiments, the method comprises processing a fluid containing one or more biomolecules through the chromatography media or the chromatography device when in an operating position of a chromatography system. For example, the fluid may comprise a protein, an antibody, a peptide, an oligonucleotide, or any combination thereof.

These and other features and advantages of the present invention will become apparent after a review of the following detailed description of the disclosed embodiments and the appended claims.

BRIEF DESCRIPTION OF THE FIGURES

The present invention is further described with reference to the appended figures, wherein:

FIG. 6 depicts a comparison of pore size distributions for silica used in Examples 9-12.

DETAILED DESCRIPTION OF THE INVENTION

Figure 1:
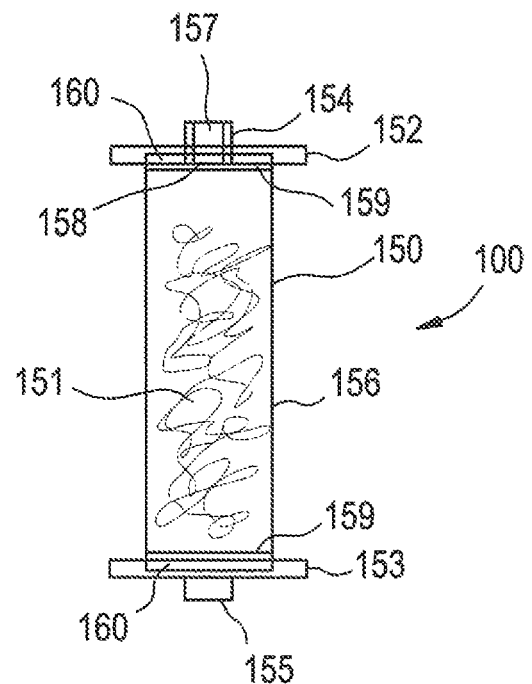
FIG. 1 depicts a view of an exemplary chromatography device of the present invention.

To promote an understanding of the principles of the present invention, descriptions of specific embodiments of the invention follow and specific language is used to describe the specific embodiments. It will nevertheless be understood that no limitation of the scope of the invention is intended by the use of specific language. Alterations, further modifications, and such further applications of the principles of the present invention discussed are contemplated as would normally occur to one ordinarily skilled in the art to which the invention pertains.

It must be noted that as used herein and in the appended claims, the singular forms "a", "and", and "the" include plural referents unless the context clearly dictates otherwise. Thus, for example, reference to "an oxide" includes a plurality of such oxides and reference to "oxide" includes reference to one or more oxides and equivalents thereof known to those skilled in the art, and so forth.

"About" modifying, for example, the quantity of an ingredient in a composition, concentrations, volumes, process temperatures, process times, recoveries or yields, flow rates, and like values, and ranges thereof, employed in describing the embodiments of the disclosure, refers to variation in the numerical quantity that may occur, for example, through typical measuring and handling procedures; through inadvertent error in these procedures; through differences in the ingredients used to carry out the methods; and like proximate considerations. The term "about" also encompasses amounts that differ due to aging of a formulation with a particular initial concentration or mixture, and amounts that differ due to mixing or processing a formulation with a particular initial concentration or mixture. Whether modified by the term "about" the claims appended hereto include equivalents to these quantities.

As used herein, the term "biomolecule" means any molecule that is produced by a living organism, including large molecules such as proteins, polysaccharides, lipids, and nucleic acids; and small molecules such a primary metabolites, secondary metabolites, and natural products. Examples of biomolecules include cells and cell debris; antibodies, proteins and peptides; nucleic acids, such as DNA and RNA; endotoxins; viruses; vaccines and the like. Other examples of biomolecules include those recited in WO 2002/074791 and U.S. Pat. No. 5,451,660.

As used herein, "inorganic oxides" is defined as binary oxygen compounds where the inorganic component is the cation and the oxide is the anion. The inorganic material includes metals may also include metalloids. Metals include those elements on the left of the diagonal line drawn from boron to polonium on the periodic table. Metalloids or semi-metals include those elements that are on the right of this line. Examples of inorganic oxides include silica, alumina, titanic, zirconia, etc., and mixtures thereof.

As used herein, "porous inorganic particles" includes particles comprised of inorganic materials, or combinations of inorganic materials (e.g., metals, semi-metals, and their alloys; ceramics, including inorganic oxides; etc.) and organic materials (e.g., organic polymers), such as composite materials, which are heterogeneous or homogeneous in nature. For example, heterogeneous composite materials include mere mixtures of materials, layered materials, core-shell, and the like. Examples of homogeneous composite materials include alloys, organic-inorganic polymer hybrid materials, and the like. The particles may be a variety of different symmetrical, asymmetrical or irregular shapes, including chain, rod or lath shape. The particles may have different structures including amorphous or crystalline, etc. The particles may include mixtures of particles comprising different compositions, sizes, shapes or physical structures, or that may be the same except for different surface treatments. Porosity of the particles may be intraparticle or interparticle in cases where smaller particles are agglomerated to form larger particles. In one exemplary embodiment the particles are composed of inorganic materials such as inorganic oxides, sulfides, hydroxides, carbonates, silicates phosphates, etc, but are preferably inorganic oxides, which may be formed via any known process including, but not limited to, solution polymerization such as for forming colloidal particles, continuous flame hydrolysis such as for forming fused particles, gelation such as for forming gelled particles, precipitation, spraying, templating, sol-gel, and the like.

As used herein, the term "ordered porous material" refers to porous particles that have structural order with a very narrow pore size distribution such that the pore size distribution has a relative span, as defined herein, of less than 0.5.

As used herein, the term "non-ordered porous material" refers to porous particles possessing a pore size distribution that is not uniform (i.e., a very broad pore size distribution that is multimodal in nature) such that the pore size distribution has a relative span, as defined herein, of greater than 0.5.

As used herein, the term "functionalized surface" means inorganic particles that have been surface modified by reaction with at least one functional compound to alter the wettability or selectivity of at least a portion of the particle surface, including the surface area on the external portion of the particles, and/or on the surface area of the internal pores. The functionalized surface may be used to form a bonded phase (covalently or ionically), a coated surface (e.g., reverse phase C18 bonded), a clad surface (e.g., carbon clad as in EP6), a polymerized surface (e.g., ion exchange), an inherent surface (e.g., inorganic/organic hybrid material), or the like. For example, reacting inorganic particles with octadecyltrichlorosilane forms a "reverse phase" by covalently bonding the silane to the inorganic surface. In another example, reaction of the inorganic particles with aminopropyltrimethoxysilane followed by quaternization of the amino group forms an "anion exchange phase". In a third example, a bonded phase may be formed by reaction of the inorganic particles with aminopropyltrimethoxysilane followed by formation of an amide with an acid chloride. Other bonded phases include diol, cyano, cation, affinity, chiral, amino, C4, C8, hydrophilic interaction (HILIC), hydrophobic interaction (HIC), mixed mode, size exclusion, etc. As part of the bonded phase or functionalized surface, a ligand may be used to show specific interaction with the target molecule or biomolecule (e.g., ligate), such as those set forth in U.S. Pat. No. 4,895,806.

As used herein, the term "linker molecule" or "linker" is used herein interchangeably to define a molecule attached to a surface of the porous inorganic particles, wherein the molecule enables attachment of other molecules, such as a biomolecule, to the surface of the porous inorganic particles via the linker molecule.

As used herein, the term "molecular weight" is defined as meaning the molar mass of a single molecule of a particular compound or polymer.

As used herein, the term "chromatography" means the process of passing a mixture dissolved in a mobile phase through a stationary phase (i.e., chromatography media) housed in a column or cartridge or other container, which separates a target molecule from other molecules in the mixture and allows it to be isolated. Depending upon the type of chromatography used, the target molecule may be adsorbed onto the stationary phase while the undesired components are passed through the device, or vice versa. The term "liquid chromatography" is a form of chromatography where a liquid is used as the mobile phase and a solid or a liquid on a solid support as the stationary phase. The term "flash chromatography" means liquid chromatography that is conducted under a positive pressure (e.g., up to 300 psi). The term "high performance liquid chromatography" (HPLC) means liquid chromatography that is conducted under a high positive pressure (e.g., up to about 5000 psi). The term "preparatory chromatography" means HPLC for the isolation and purification of a target compound or molecule. The term "fast protein liquid chromatography" (FPLC) is a form of HPLC useful for the separation of biomolecules.

As used herein, the term "impurities" means materials present in the inorganic particles, other than the inorganic.

As used herein, the term "irregular" as it applies to the inorganic particles means that the particle shape from one particle to the next is not uniform (i.e., random particle shape) with an aspect ratio of greater than 1.0.

As used herein, the term "housing" means vessel or container for holding a stationary phase for use in chromatography, and includes cartridges, columns, tubes, devices, beds, bags, and the like.

As used herein, the term "stationary phase" or "chromatography media" or "chromatography support" means a material that includes a functionalized surface (e.g., ligands attached to the surface of the inorganic particles via some functional group) that shows different affinities for different components in a sample mixture, which is used in chromatography to separate a target molecule (e.g., ligates) from a mixture of one or more other molecules. Stationary phases include organic and inorganic materials, or hybrids thereof, and may be in the form of particles, monoliths, membranes, coatings, and the like.

As used herein, the term "pore size distribution" means the relative abundance of each pore size in a representative volume of porous inorganic particles.

As used herein the term "median pore diameter" ($d_{50}$) is used to mean the middle point for pore diameter at which 50% of pore volumes are contributed from pores having a smaller pore diameter than the middle point diameter and 50% are contributed from pores having a larger diameter than the middle point diameter.

As used herein the term "pore volume" is defined as the volume of a liquid which is adsorbed into the pore structure of the sample at saturation vapor pressure, assuming that the adsorbed liquid has the same density as the bulk density of the liquid. The mercury measurement of the pore volume and the pore size distribution of the porous inorganic particles in the present invention may be obtained using any suitable mercury porosimeter capable of a pressure range of atmospheric pressure to about 4100 bar, with a contact angle, $\theta=140°$, and a mercury surface tension of 485 dynes/cm at $25.2°$ C. (Hg density at such temperature is 13.5335 g/ml).

As used herein, the term "relative span" is defined as a measure of the breadth of pore size distribution. The "span" is measured by subtracting the $d_{10}$ pore size (i.e., the pore size/diameter below which 10% of the pore volume resides) from the $d_{90}$ pore size (i.e., the pore size/diameter below which 90% by pore volume resides) as measured by mercury porosimetry. The term "relative span" is defined as the ratio of $(d_{90}-d_{10})/d_{50}$.

The term "surface area" as used herein is determined by BET surface area analysis. The BET method of measuring surface area has been described in detail by Brunauer, Emmett and Teller in *J. Am. Chem. Soc.* 60 (1938) 309-319, which is incorporated herein by reference.

As used herein the term "dynamic binding capacity" as it relates to a chromatography media is used herein to indicate the amount of target protein the media will bind under flow conditions before significant breakthrough of unbound protein occurs. In practice, the chromatography media is packed into a column or a cartridge and a solution of the target protein in low ionic strength buffer is running through the column. Unbounded protein will start to come out of the column once the binding of protein onto the media has reached its maximal capacity. A breakthrough curve will be generated and under the same conditions, the longer time it takes for the protein to start the breakthrough, the higher binding capacity the media has.

As used herein the term "nonspecific protein binding" is used herein to indicate that impurity proteins bind onto affinity media due to nonspecific interactions, this binding is undesired and would reduce the binding capacity of desired proteins such as IgG in the case of Protein A chromatography and would also lead to the presence of higher amount of impurities in the chromatography products after all the proteins are eluted in the elution step. One of the common causes of nonspecific binding is the interactions of proteins with other types of functional groups on the media (such as unreacted, exposed silanol groups on silica surface).

The present invention is directed to chromatography media, and chromatography devices, such as chromatography columns. The present invention is further directed to methods of making chromatography media and chromatography columns, as well as methods of using chromatography columns. A description of exemplary chromatography media, exemplary chromatography columns, methods of making chromatography media and chromatography columns, and methods of using chromatography media and chromatography columns is provided below.

FIG. 1 provides a view of an exemplary chromatography column 100 of the present invention. As shown in FIG. 1, exemplary chromatography column 100 comprises a column housing 150; and media bed space 151 positioned within column housing 150. In some embodiments, media 151 comprises porous inorganic particles having a median pore diameter of from about 600 Å to about 1600 Å; a pore size distribution relative span of at least about 0.75; and a functionalized surface comprising an average of from greater than about 1 to about 3 linker molecules per square nanometer of surface area of said porous inorganic particles. In some embodiments, media 151 comprises porous inorganic particles having a median pore diameter of from about 600 Å to about 1600 Å; a pore size distribution relative span of at least about 0.75; and a functionalized surface comprising a protein covalently bonded to surface portions of said porous inorganic particles, said protein having a molecular weight ranging from about 10,000 to about 100,000 D. In some embodiments, media 151 comprises porous inorganic particles having an average BET surface area of from about 20 $m^2/g$ to about 100 $m^2/g$; an average pore volume of at least about 1 ml/g; a pore size distribution relative span of at least about 0.75; a functionalized surface comprising an average of from greater than about 1 to about 3 linker molecules per square nanometer of surface area of said porous inorganic particles; and a protein covalently bonded to at least some of said linker molecules, said protein having a molecular weight ranging from about 10,000 to about 100,000 D.

As further shown in FIG. 1, column housing 150 typically comprises a tubular housing member 156, a first tubular housing member end cap 152, a second tubular housing member end cap 153 opposite end cap 152, a column inlet 154, and a column outlet 155. The column 100 may be packed with porous inorganic particles in the form of a slurry through column inlet 154, the column inlet comprising a central bore 157 having a passageway therein, and nozzle 158. A wide range of nozzles may be used which facilitate the distribution and even packing of slurry within the bed space. Filters 159 are each positioned on the interior face of the end caps 152, 153 and act with the tubular member 156 to define the bed space 151 and also to prevent leakage of particulate medium from the bed space 151. A distribution channel 160 is located transversely across the face of the first end cap 152 and/or second end cap 153, and is in fluid communication with filter 159. The fluid distribution channel 160 acts to facilitate radial distribution of the liquid. In a simple form, the distribution channel 160 comprises at least one circumferential and/or radial groove in the face of the first and/or second end caps 152 and 153. The groove is positioned such that it effects the circumferential and/or radial distribution of liquid emanating from nozzle 158 of inlet 154. It will be understood that a wide range of column capacities is possible, typically ranging from 0.1 to 2000 liters, and 0.1 to 100 liters when using the column as a disposable column. See also U.S. Patent Application Publication No. 2008/0017579, the entire subject matter of which is hereby incorporated herein by reference in its entirety.

Column housing 150 may be formed from a variety of materials. Typically, column housing 150 comprises a polymeric material, a metal material, a glass material, a ceramic material, or a composite thereof, and in some desired embodiments, comprises a biodegradable polymeric material. Suitable polymeric materials for forming column housing 150 include, but are not limited to, any synthetic or semi-synthetic organic solid, such as plastics that are moldable, including polyolefins. Suitable metal materials for forming column housing 150 include, but are not limited to, stainless steel.

Column housing 150 may be formed using conventional thermoforming techniques. For example, tubular housing member 156, first tubular housing member end cap 152, and second tubular housing member end cap 153 of column housing 150 may each independently be formed via a molding step. In some embodiments, tubular housing member 156 and one of (i) first tubular housing member end cap 152 and (ii) second tubular housing member end cap 153 of column housing 150 are formed via a single molding step (i.e., one of the end caps is integrally formed on one end of tubular housing member 156).

As discussed above, media 151 positioned within column housing 150 may comprise porous inorganic particles having a median pore diameter of from about 600 Å to about 1600 Å. In some embodiments, the porous inorganic particles have a median pore diameter of from about 800 Å to about 1500 Å (or any value between, and including, 1000 Å and 1300 Å in increments of 1.0 Å (e.g., 1280 Å). In still some embodiments, the porous inorganic particles have a median pore diameter of from about 1000 Å to about 1300 Å or any range of values between, and including 1000 Å to about 1300 Å (e.g. from about 1080 Å to about 1260 Å).

The porous inorganic particles typically have a pore volume, as measured by Hg porosimetry, of at least about 0.9 ml/g, or at least 1.0 ml/g. In one exemplary embodiment of the present invention, the porous inorganic particles have a pore volume, as measured by nitrogen porosimetry, of from about 1.0 ml/g to about 3.0 ml/g. In another exemplary embodiment of the present invention, the porous inorganic particles have a pore volume, as measured by Hg porosimetry, of from about 1.0 ml/g to about 2.0 ml/g.

The porous inorganic particles may have a pore size distribution such that generally at least 40% of the total pore volume have pores in a diameter between about 600 Å to about 1600 Å. In one embodiment, from about 40% to about 90% of the total pore volume have pores in a diameter between about 600 Å to about 1600 Å.

In a preferred embodiment, at least 20% of the total pore volume have pores in a diameter ranging from about 1000 Å to about 1600 Å. In another embodiment, from about 20% to about 60% of the total pore volume have pores in a diameter between about 1000 Å to about 1600 Å.

In another embodiment, at least 15% of the total pore volume have pores in a diameter between 1200 Å to about 1500 Å. In other embodiments, about 15% to about 30% of the total pore volume have pores in a diameter between about 1200 Å to about 1500 Å.

The porous inorganic particles may have a relative span with regard to pore size distribution of at least about 0.8, or at least about 0.9, or at least about 1.0, or at least about 1.1, or at least about 1.2, or at least about 1.3, or at least about 1.4, or at least about 1.5. In some embodiments, the porous inorganic particles have a relative span with regard to pore size distribution of at least about 0.8, or at least about 0.9, or at least about 1.0, or at least about 1.1, or at least about 1.2, or at least about 1.3, or at least about 1.4, or at least about 1.5, all up to about 2.0.

The porous inorganic particles typically have a particle size, as measured by light scattering measurements ranging from about 1 micron (µm) to about 150 µm. The porous inorganic particles typically have median particle size of at least about 1 µm, more typically, less than about 120 µm. In some embodiments, the porous inorganic particles have an average particle dimension of from about 10 to about 120 µm, more desirably, from about 30 to about 120 µm. In other embodiments, the porous inorganic particles have an average particle dimension of from about 50 to about 90 µm. In one desired embodiment, the porous inorganic particles have an average particle dimension of about 70 µm.

The porous inorganic particles typically have an irregular shape, but may have any shape (e.g., spherical, elliptical, etc.). Regardless of shape, the porous inorganic particles typically have an average particle dimension as discussed herein.

The porous inorganic particles typically have an aspect ratio of at least about 1.0 as measured, for example, using Transmission Electron Microscopy (TEM) techniques. As used herein, the term "aspect ratio" is used to describe the ratio between (i) the average particle dimension of the porous inorganic particles and (ii) the average cross-sectional particle dimension of the porous inorganic particles, wherein the cross-sectional particle dimension is substantially perpendicular to the largest particle dimension of the porous inorganic particles. In some embodiments of the present invention, the porous inorganic particles have an aspect ratio of at least about 1.1 (or at least about 1.2, or at least about 1.3, or at least about 1.4) up to about 5.0. Typically, the porous inorganic particles have an aspect ratio of from about 1.0 to about 1.5.

The porous inorganic particles may also have a surface area, as measured by the BET nitrogen adsorption method (i.e., the Brunauer Emmett Teller method), of at least about 10 $m^2/g$, or at least about 20 $m^2/g$, or at least about 25 $m^2/g$, or at least about 30 $m^2/g$. In one exemplary embodiment of the present invention, the porous inorganic oxide particles have a BET surface area of from about 20 $m^2/g$ to about 200 $m^2/g$, or from 25 $m^2/g$ to about 150 $m^2/g$ or from about 30 $m^2/g$ to about 100 $m^2/g$. In a further exemplary embodiment of the present invention, the porous inorganic oxide particles have a BET surface area of from about 20 $m^2/g$ to about 500 m²/g, or from about 20 m²/g to about 200 m²/g, or from about 20 m²/g to about 100 m²/g.

The porous inorganic particles may comprise a variety of inorganic materials including, but not limited to, silica, alumina, zirconia, or mixtures thereof. In one desired embodiment, the porous inorganic particles comprise silica. When the porous inorganic particles comprise silica, the particles desirably comprise silica having a purity of at least about 93% by weight $SiO_2$, or at least about 93% by weight $SiO_2$, at least about 94% by weight $SiO_2$, at least about 95% by weight $SiO_2$, at least about 96% by weight $SiO_2$, at least about 97% by weight $SiO_2$, or at least about 98% by weight $SiO_2$ up to 100% by weight $SiO_2$ based upon the total weight of the particle.

The present invention is also directed to methods of making the herein-described chromatography media. In one exemplary method, the method of making chromatography media comprises porous inorganic particles, wherein the porous inorganic particles have a median pore diameter of from about 600 Angstroms (Å) to about 1600 Å, and a pore size distribution relative span of at least about 0.75; and reacting surface portions of the porous inorganic particles with at least one reactant so as to form a functionalized surface comprising an average of from greater than about 1 to about 3 linker molecules per square nanometer of surface area of the porous inorganic particles. In another exemplary method, the method of making chromatography media comprises forming porous inorganic particles, wherein the porous inorganic particles have a median pore diameter of from about 600 Å to about 1600 Å, and a pore size distribution relative span of at least about 0.75; and reacting surface portions of the porous inorganic particles with at least one reactant so as to form a functionalized surface comprising a protein covalently bonded to surface portions of said porous inorganic particles, said protein having a molecular weight ranging from about 10,000 to about 100,000 D. In yet another exemplary method, the method of making chromatography media comprises forming porous inorganic particles, wherein the porous inorganic particles have an average BET surface area of from about 20 m²/g to about 100 m²/g, an average pore volume of at least about 1 ml/g, and a pore size distribution relative span of at least about 0.75; and reacting surface portions of the porous inorganic particles with at least one reactant so as to form a functionalized surface comprising an average of from greater than about 1 to about 3 linker molecules per square nanometer of surface area of said porous inorganic particles; and a protein covalently bonded to at least some of said linker molecules, said protein having a molecular weight ranging from about 10,000 to about 100,000 D.

The porous inorganic particles may be prepared from a variety of porous inorganic materials. In some embodiments, the porous inorganic particles comprise porous precipitated inorganic oxides, inorganic oxide gels and fumed oxides.

In embodiments comprising gels, the parent particles are derived from porous inorganic oxide gels such as, but not limited to, gels comprising $SiO_2$. The gels can be hydrogels, aerogels, or xerogels. A hydrogel is also known as an aquagel, which is formed in water and as a result its pores are filled with water. A xerogel is a hydrogel with the water removed. An aerogel is a type of xerogel from which the liquid has been removed in such a way as to minimize any collapse or change in the gel's structure as the water is removed.

Gels are well known in the art. See Iler's "The Chemistry of Silica", p. 462 (1979). Gel, e.g. silica gel, particles are distinguishable from colloidal silica or precipitated silica particles. For example, colloidal silica is prepared as a slurry of dense, non-porous silica particles. Colloidal silica particles typically are smaller than 200 nm (0.2 micron). As mentioned earlier, these particles do not have internal porosity. On the other hand, typical dispersed precipitated particles have some internal porosity. In some cases, the internal porosity in typically precipitated particles, however, largely collapse under capillary pressure created by receding menisci of water as the water evaporates during drying. The conditions for making colloidal silica and precipitated silica are well known.

Gels, on the other hand, are prepared under conditions which promote coalescence of primary particles (typically having median particles sizes of about 1 to about 10 nm, as measured under transmission electron microscopy, i.e., TEM) to form a relatively rigid three dimensional network. The coalescence of gel is exhibited on a macroscale when a dispersion of inorganic oxide, e.g., silica, hardens to a "gel" or "gelled" mass having structural integrity.

Methods of preparing inorganic oxide gels are well known in the art. For example, a silica gel is prepared by mixing an aqueous solution of an alkali metal silicate (e.g., sodium silicate) with a strong acid such as nitric or sulfuric acid, the mixing being done under suitable conditions of agitation to form a clear silica sol which sets into a hydrogel, i.e., macrogel, in less than about one-half hour. The resulting gel is then washed. The concentration of inorganic oxide, i.e., $SiO_2$, formed in the hydrogel is usually in the range of about 10 and about 50, preferably between about 20 and about 35, and most preferably between about 30 and about 35 weight percent, with the pH of that gel being from about 1 to about 9, preferably 1 to about 4. A wide range of mixing temperatures can be employed, this range being typically from about 20 to about 50° C.

The newly formed hydrogels are washed simply by immersion in a continuously moving stream of water, which leaches out the undesirable salts, leaving about 99.5 weight percent or more pure inorganic oxide behind.

The pH, temperature, and duration of the wash water will influence the physical properties of the silica, such as surface area (SA) and pore volume (PV). Silica gel washed at 65-90° C. at pH's of 8-9 for about 15 to about 36 hours will usually have SA's of about 250 to about 400 m²/g and form aerogels with PV's of about 1.4 to about 1.7 ml/g. Silica gel washed at pH's of 3-5 at about 50 to about 65° C. for about 15 to about 25 hours will have SA's of about 700 to about 850 m²/g and form aerogels with PV's of about 0.6 to about 1.3 ml/g. These measurements are generated by the well known $N_2$ porosity method. Hydrogel is dried by blowing air at a temperatures ranging from 100 to 180° C. through the hydrogel bed until the moisture in the gel is less than about 20%, preferably less than about 10%, and more preferably less than about 5% by weight. Processes for making xerogels may be found in U.S. Pat. Nos. 6,565,905 and 5,622,743.

Reinforced precipitated silica such as that described in U.S. Pat. No. 4,157,920 can also be used to prepare the chromatography media of the present invention. The contents of that patent are incorporated herein by reference. For example, reinforced precipitated silicas can be prepared by first acidulating an alkali inorganic silicate to create an initial precipitate. The resulting precipitate is then reinforced or "post conditioned" by additional silicate and add. The precipitate resulting from the second addition of silicate and add comprises 10 to 70% by weight of the precipitate initially prepared. It is believed that the reinforced structure of this precipitate is more rigid than conventional precipitates as a result of the second precipitation. It is believed that even after milling, centrifuging and subsequent drying, the reinforced silicate substantially maintains its network rigidity and porosity. This is in contrast to other precipitated silicas such as those disclosed in U.S. Pat. No. 5,030,286.

In another embodiment, the inorganic oxide comprises fumed silica. Fumed silica may be fabricated using the processes described in DE 762723. Production of fumed silica is also discussed in Ullmann's Encyclopedia of Industrial Chemistry, Vol. A23, 1993, Chapter 6.

Once the porous particles are formed, they are then milled. The general milling conditions can vary depending on the feed material, residence time, impeller speeds, and milling media particle size. These conditions can be varied to obtain the desired size within the range of about 1 to about 120 microns. The techniques for selecting and modifying these conditions to obtain the desired particle size are known to those skilled in the art. The milling equipment used to mill the porous inorganic oxide particles should be of the type capable of severely milling and reducing materials to particles having sizes about 1 to about 120 microns, e.g., through mechanical action. Such mills are commercially available, with hammer and sand mills being particularly suitable for this purpose. Hammer mills impart the necessary mechanical action through high speed metal blades, and sand mills impart the action through rapidly churning media such as zirconia or sand beads. Impact mills can also be used. Both impact mills and hammer mills reduce particle size by impact of the inorganic oxide with metal blades. Other suitable mills for use in this invention include, but are not limited to, the Air Classifying Mill (ACM) or the Fluid Energy Mill (FEM). The milled inorganic oxide particles may be classified using an air classifier if not performed during the milling process.

In one embodiment of the present invention, the milled porous inorganic particles are then treated hydrothermally at about 100 to about 400° C. for about 2 to about 20 hours and at a pH of about 8 to about 10. Alternatively, the hydrothermal treatment may be conducted as set forth in U.S. Pat. Nos. 5,976,479; 4,732,887; and 4,104,363. The conditions of the hydrothermal treatment affect the pore volume, surface area, pore size and structural integrity of the particles.

The porous inorganic oxide particles may be surface modified (i.e., functionalized) so as to selectively enhance bonding of a desired material to the inorganic oxide particle surface. For example, the porous inorganic oxide particles may further comprise a surface chemistry in the form of one or more chemical moieties bonded thereto so as to selectively bond to one or more materials within a given fluid processed through, for example, a chromatography column, which is referred to herein as a functionalized surface. Chemical moieties such as bifunctional ligands, etc. may be bonded to the particle surface, for example, as described in U.S. Pat. No. 7,166,213 assigned to W. R. Grace & Co.-Conn., the subject matter of which is incorporated herein by reference in its entirety. In one embodiment, this stationary/bonded phase, or chromatography media, includes an active group or ligand as part of the functionalized surface of the particle, and is typically covalently bonded to the particle via some linkage. The ligand may be any chemical species that shows specific interaction with another molecular component in this case, the target biomolecule. Known ligands include, but are not limited to, charged groups (such as sulfonic acid, quarternary ammonium, diethyl aminoethyl, carboxyl methyl); synthetic dyes; alkyl and aryl compounds (such as phenyl boronate, octyl); proteins; lectins; antibodies; antigens, enzymes and so on. Ligates, that is compounds which can be separated by chromatographic techniques, include a wide range of biomolecules such as proteins; enzymes; peptides; antibodies; antigens; lectins; DNA; RNA; antibiotics; etc.

In one embodiment of the present invention, the method of making chromatography media comprises reacting surface portions of the porous inorganic particles with at least one reactant so as to form a functionalized surface. In one embodiment, surface portions of the inorganic oxide particles are treated with a silane so as to provide a functionalized surface comprising a reaction product resulting from a reaction between (i) hydroxyl groups (e.g., silanol groups) on the porous inorganic particles and (ii) the silane so as to provide an average of from greater than about 1 to about 3 linker molecules per square nanometer of surface area of said porous inorganic particles. In some embodiments, the method of making chromatography media comprises reacting surface portions of the porous inorganic particles with at least one reactant so as to form a functionalized surface, wherein the at least one reactant comprises an epoxy silane. See, for example, FIG. 3. The resulting functionalized surface comprises a reaction product resulting from a reaction between hydroxyl groups on the porous inorganic particles and an epoxy silane. In one desired embodiment, the method of making chromatography media comprises reacting surface portions of the porous inorganic particles with at least one reactant so as to form a functionalized surface, wherein the at least one reactant comprises an epoxy silane comprising (3-glycidyloxypropyl) trimethoxysilane. In this embodiment, the resulting functionalized surface comprising a reaction product resulting from a reaction between hydroxyl groups on the porous inorganic particles and (3-glycidyloxypropyl) trimethoxysilane.

In another embodiment of the present invention, the functionalized surfaces of the porous inorganic particles comprise a diol. In this embodiment, the method of making chromatography media may comprise converting at least one functional group (epoxy ring) on the silane to two hydroxyl groups so as to form a did. See, for example, FIG. 3. In this embodiment, the resulting functionalized surface desirably comprises (i) a diol and (ii) unreacted hydroxyl groups on the porous inorganic particles. For example, in some embodiments, the surface diol group present in an amount ranging from about 30 to about 150 µmol/g (or any amount between, and including, 30 and 150 µmol/g, in increments of 1.0 µmol/g, or any range of amounts between, and including, 30 and 150 µmol/g, e.g., from about 32 to about 45 µmol/g) of the porous inorganic particles. In some embodiments, the surface diol group present in an amount ranging from about 50 to about 100 µmol/g of the porous inorganic particles.

In another embodiment of the present invention, the functionalized surfaces of the porous inorganic particles comprise an aldehyde. In this embodiment, the method of making chromatography media may comprise forming at least one diol group on the surface of the silica using the method as mentioned herein above, converting at least one diol to an aldehyde group, reacting at least one aldehyde group with at least one free amino group on the desired protein to form an imine group and reducing the imine group to an amine. See, for example, FIG. 3.

In yet another embodiment of the present invention, the functionalized surfaces of the porous inorganic particles comprise a protein covalently linked to the surfaces of said porous inorganic particles (e.g., via at least some of the linker molecules). In these embodiments, the method of making chromatography media may further comprise covalently bonding a protein to the functionalized surface via the amine group. See, for example, FIG. 3. The resulting functionalized surface desirably comprises (i) a protein covalently linked to surfaces of the porous inorganic particles and (ii) unreacted hydroxyl groups on the porous inorganic particles. In one desired embodiment, the method of making chromatography media comprises comprise covalently bonding recombinant Protein A (rProA) to the functionalized surface via the amine group. The resulting functionalized surface comprises recombinant Protein A (rProA) covalently linked to surfaces of the porous inorganic particles. When present, the protein is typically present in an amount ranging from about 4.0 to about 16 mg/ml of the porous inorganic particles. In one desired embodiment, the protein is present in an amount ranging from about 5.0 to about 12 mg/ml of the porous inorganic particles.

Generally, the above-described chromatography media of the present invention has a functionalized surface comprising an average of from greater than about 1 to about 3 linker molecules per square nanometer of surface area of said porous inorganic particles. In some embodiments, the media comprises a functionalized surface comprising an average of from about 1.1 to about 2.5 linker molecules per square nanometer of surface area of said porous inorganic particles. In other embodiments, the media comprises a functionalized surface comprising an average of from about 1.3 to about 2.0 linker molecules per square nanometer of surface area of said porous inorganic particle.

Figure 5A:
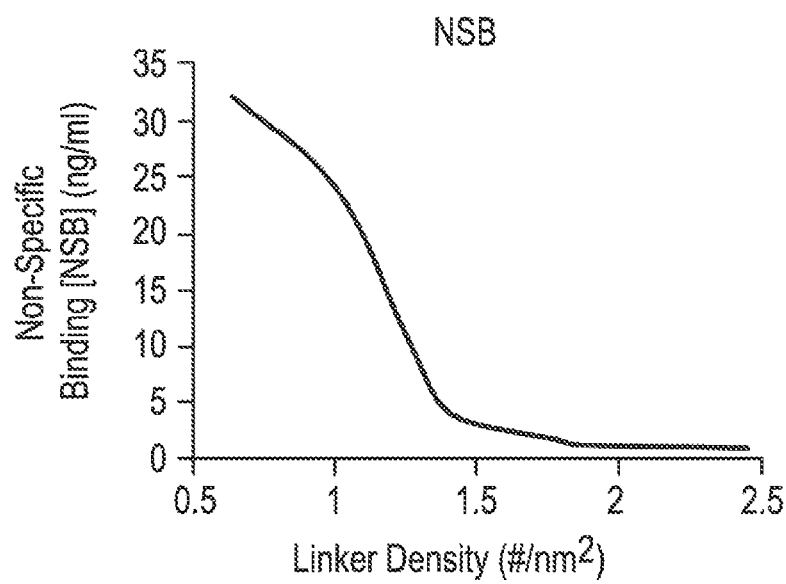
FIG. 5A depicts a graph of non specific binding versus linker density of an exemplary embodiment of the chromatography media of the invention used in Examples 1-8.

When used in an affinity column, in some desired embodiments, the above-described chromatography media of the present invention has a non-specific protein binding level of less than about 20.0 ng/ml (or any value below, and including, 20.0 ng/ml, in increments of 0.1 ng/ml, e.g., 4.8 ng/ml, or any range of values below, and including, 20.0 ng/ml, e.g., from greater than 0 to about 10 ng/ml), as shown in FIG. 5A. In one embodiment, the chromatography media, when used in an affinity column, has a non-specific protein binding level of less than about 5.0 ng/ml.

Figure 5B:
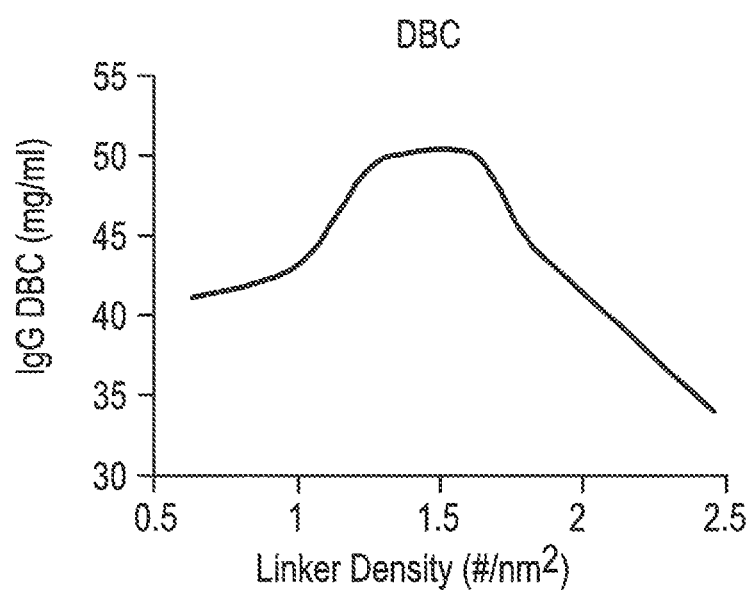
FIG. 5B depicts a graph of dynamic binding capacity versus binder density of an exemplary embodiment of the chromatography media of the invention used in Examples 1-8.

In some desired embodiments, the above-described chromatography media of the present invention, when used in an affinity column, also has a dynamic binding capacity of at least 30 mg/ml (or any value above, and including, 30 mg/ml, in increments of 0.1 mg/ml, e.g., 60.8 mg/ml, or any range of values above, and including, 30 mg/ml, e.g., from about 41.2 to about 85.2 mg/ml), as shown in FIG. 5B. In one embodiment, the chromatography media, when used in an affinity column, has a dynamic binding capacity of from about 30 to about 90 mg/ml.

Figure 2:
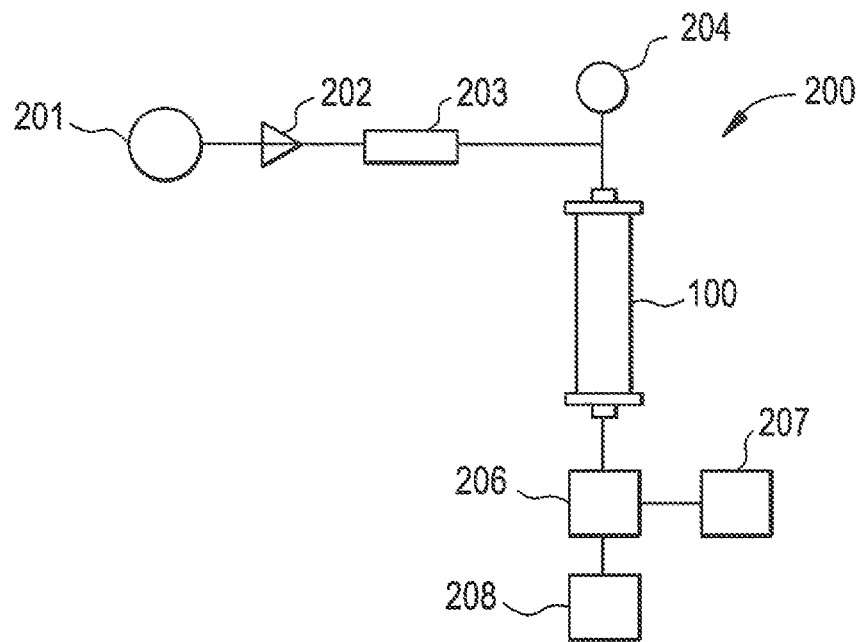
FIG. 2 depicts a view of an exemplary chromatography system comprising the chromatography column shown in FIG. 1.

As discussed above, the present invention is further directed to chromatography devices such as chromatography column 100 shown in FIGS. 1-2. In one embodiment, the chromatography device of the present invention comprises: a device housing; and chromatography media positioned within the device housing, wherein the chromatography media comprising the herein-described chromatography media. The device housing of the chromatography device comprises a tubular housing member, and at least one separate and attachable tubular housing member end cap. The device housing may comprise a polymeric material, a metal material, a glass material, a ceramic material, or a composite thereof. In one embodiment, the device housing comprises a biodegradable polymeric material. In another embodiment, the device housing comprises a metal material such as stainless steel.

In some embodiments, the chromatography device comprises a pre-packed disposable column.

In some desired embodiments of the present invention, the chromatography device comprises chromatography media that has a non-specific protein binding level of less than about 20.0 ng/ml. In some desired embodiments of the present invention, the chromatography device comprises chromatography media that has a non-specific protein binding level of less than about 5.0 ng/ml. In some desired embodiments of the present invention, the chromatography device comprises chromatography media that has a dynamic binding capacity of at least 30 mg/ml. In some desired embodiments of the present invention, the chromatography device comprises chromatography media that has a dynamic binding capacity of from about 30 to about 90 mg/ml.

In some desired embodiments of the present invention, the chromatography device comprises an affinity column. Desirably, the chromatography device has a device back pressure of less than 5.0 bar when the chromatography media is run at a linear velocity of about 1000 cm/h.

The chromatography columns of the present invention, such as exemplary chromatography column 100, may be tailored for use in a given application. Regardless of application, the chromatography columns of the present invention, such as exemplary chromatography column 100, may be sized so as to be insertable into a variety of chromatography systems. FIG. 2 depicts a view of an exemplary chromatography system 200 comprising chromatography column shown in FIG. 1.

As shown in FIG. 2, exemplary chromatography system 200 comprises the following components: chromatography column 100, solvent reservoir 201, pump 202, pre-column 203, injection port 204, detector 206, recorder/monitor 207, and waste collector 208. Although not shown in FIG. 2, chromatography column 100 may be used in combination with other system components suitable for use in chromatography systems, such as exemplary chromatography system 200, wherein the other system components include, but are not limited to, multiple solvent reservoirs 201, a vacuum pump, a flow splitter, a pressure gauge, a degasser, a fraction collector, etc.

The present invention is also directed to methods of making chromatography devices. In one embodiment, the method of making a chromatography device comprises incorporating the herein-described chromatography media into a device (e.g., column) housing. The method of making a chromatography device may further comprise one or more additional steps. Suitable additional steps include, but are not limited to, forming the device housing via a thermoforming step (e.g., any molding step, e.g., injection molding); cleaning the porous inorganic oxide particles positioned within the column housing by exposing the porous inorganic oxide particles to a non-NaOH solution; validating the chromatography column via one or more validation tests; and packaging the cleaned, validated chromatography column in a shippable container.

In the disclosed methods, the step of forming the device housing via a thermoforming step may comprise thermoforming a tubular housing member, and at least one separate and attachable tubular housing member end cap. In some embodiments, the thermoforming step comprises thermoforming (i) a tubular housing member having a first open end and a closed opposite end (i.e., an integrally formed end cap having a column housing outlet therein), and (ii) a first tubular housing member end cap that is separate and attachable to the open end of the tubular housing member. In other embodiments, the thermoforming step comprises thermoforming (i) a tubular housing member having opposite open ends, (ii) a first tubular housing member end cap separate and attachable to a first open end of the tubular housing member, and (iii) a second tubular housing member end cap separate and attachable to a second open end of the tubular housing member, the second tubular housing member end cap being attachable to the tubular housing member end cap opposite the first tubular housing member end cap.

The present invention is further directed to methods of using the herein-described chromatography media and chromatography devices. In one embodiment, the method of using the herein-described chromatography media comprises the step of incorporating the chromatography media into an affinity column. In one embodiment, the method of using the herein-described chromatography devices comprises the step of positioning the chromatography device within an operating position of a chromatography system, such as a system as shown in FIG. 2. The methods of using the herein-described chromatography media and chromatography devices may further comprise processing a fluid through the affinity column or the chromatography device. In some embodiments, the method of using the herein-described chromatography media and chromatography devices comprises processing a fluid containing one or more biomolecules through the affinity column or the chromatography device. For example, the fluid may comprise a protein, a peptide, an oligonucleotide, an antibody (e.g., a monoclonal antibody), a virus, a vaccine or any combination thereof.

In one embodiment, the mobile phase or liquid containing one or more analytes (target molecule) or substances for separation on the column 100 is added via column inlet 154. Mobile phase exiting the outlet 158 into the bed space 151 will be distributed evenly across the distribution channel 160, pass through filter 159 and then be eluted uniformly through the bed of particulate medium 151. The mobile phase will finally exit the column through column outlet 155.

The disclosed methods of using a chromatography device of the present invention, such as exemplary chromatography column 100, advantageously do not comprise a clean-in-place step within the chromatography system (e.g., exemplary chromatography system 200 shown in FIG. 2). In other words, multiple runs may be performed on a given chromatography system, such as exemplary chromatography system 200 shown in FIG. 2, without the need to have a clean-in-place step. Instead, when a given chromatography column has been used and needs to be cleaned, the used chromatography column is replaced with a replacement chromatography column, and the chromatography system continues to operate without the delays associated with a clean-in-place step.

The disclosed methods of using the disclosed chromatography devices of the present invention may also comprise the step of providing the chromatography device to a user, wherein the providing step comprises providing a pre-packed and validated chromatography column to the user. This step eliminates the need for the user to perform one or more column preparation steps, and further enables an efficient use of the user's time and processing capacity.

Methods of using disposable chromatography columns may be suitable for separating one or more biomolecules from a sample. Although not limited to any particular application, the methods of using disposable chromatography columns of the present invention may be used to separate one or more biomolecules from a sample, wherein the one or more biomolecules are selected from at least one protein, peptide, oligonucleotide, polysaccharides, lipids, nucleic acids, metabolites, viruses, vaccines, or any combination thereof.

In exemplary embodiments, the chromatography media of the present invention may be used in a variety of applications including all of the bonded phases mentioned herein, for example, such as on exchange chromatography, hydrophobic interaction chromatography, affinity chromatography, size exclusion, and the like. Ion exchange chromatography is frequently used in protocols for the isolation of immunoglobulins. In anion exchange chromatography, negatively charged amino acid side chains of the Immunoglobulin will interact with positively charged ligands of a chromatography matrix. In cation exchange chromatography on the other hand, positively charged amino acid side chains of the immunoglobulin will interact with negatively charged ligands of a chromatography matrix. Hydrophobic interaction chromatography (HIC) is another method described and used in protocols for the isolation of immunoglobulins. If a highly pure immunoglobulin product the object, it is commonly recommended to combine HIC with one or more further steps. In HIC, in order to make the immunoglobulin bind efficiently to the HIC matrix, addition of lyotropic salts to the mobile phase is required. The bound immunoglobulin is subsequently released from the matrix by lowering the concentration of lyotropic salt. Affinity chromatography is based on specific interactions between a target biomolecule and a biospecific ligand in a principle of lock-key recognition. Thus, the target and ligand will constitute an affinity pair, such as antigen/antibody, enzyme/receptor etc. Protein-based affinity ligands are well known, such as Protein A, Protein G and Protein L affinity chromatography which are both widespread methods for isolation and purification of antibodies. It is well known that Protein A chromatography provides an outstanding specificity, particularly towards monoclonal antibodies, and consequently high purities are obtainable. Used in combination with ion exchange, hydrophobic interaction, hydroxyapatite and/or gel filtration steps, Protein A based methods have become the antibody purification method of choice for many biopharmaceutical companies, see e.g. International Patent Publication No. WO8400773 and U.S. Pat. No. 5,151,350.

In exemplary embodiments, the chromatography media of the present invention may be used in a variety of applications, such as mixed mode or multi-modal separation matrices or media. The term "multi-modal" separation media refers to matrix capable of providing at least two different, but cooperative, sites which interact with the compound to be bound. For example, one of these sites may give an attractive type of charge-charge interaction between the ligand and the substance of interest. The other site may give electron acceptor-donor interaction and/or hydrophobic and/or hydrophilic interactions. See e.g., U.S. Pat. No. 7,714,112. In addition, the porous particles of the present invention may be used in expanded bed adsorption (see e.g., U.S. Pat. No. 6,620,326); as part of a membrane to improve purification performance (see e.g., U.S. Patent Application Publication No. 2011/0049042); used in applications with fluidized bed adsorption (see e.g., U.S. Patent Application Publication No. 2005/0269257), and in any other applications suitable for purification or adsorption using wide pore materials.

The present invention is further illustrated by the following examples, which are not to be construed in any way as imposing limitations upon the scope thereof. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

EXAMPLES

The following examples describe (i) processes in accordance with the present invention for preparing chromatography media having functionalized surfaces, namely, silica with protein A attached, and (ii) the evaluation of the materials including column packing and the use of columns. One embodiment of the present invention shown in the examples relates to functionalizing silica particles were prepared by a process which consisted of the following steps: bonding of large pore silica with (3-glycidyloxypropyl)trimethoxysilane, followed by sulfuric acid hydrolysis to form an initially bonded diol silane intermediate; converting diol groups to aldehyde groups by oxidation with sodium periodate; incubating protein A with the functionalized silica; and finally reductive amination. Such a process is shown as in FIG. 3.

The median particle sizes reported in the Examples were determined by light scattering using a Malvern Mastersizer 2000 available from Malvern Instruments Ltd. per ASTM B822-10. Median pore diameter distributions were measured by mercury intrusion using an Autopore IV 9520 available from Micromeritics Instrument Corp. Pore volumes referenced herein represent mercury intrusion into 100-10,000 Å size pores. BET surface areas were obtained from the nitrogen sorption analysis.

Figure 4:
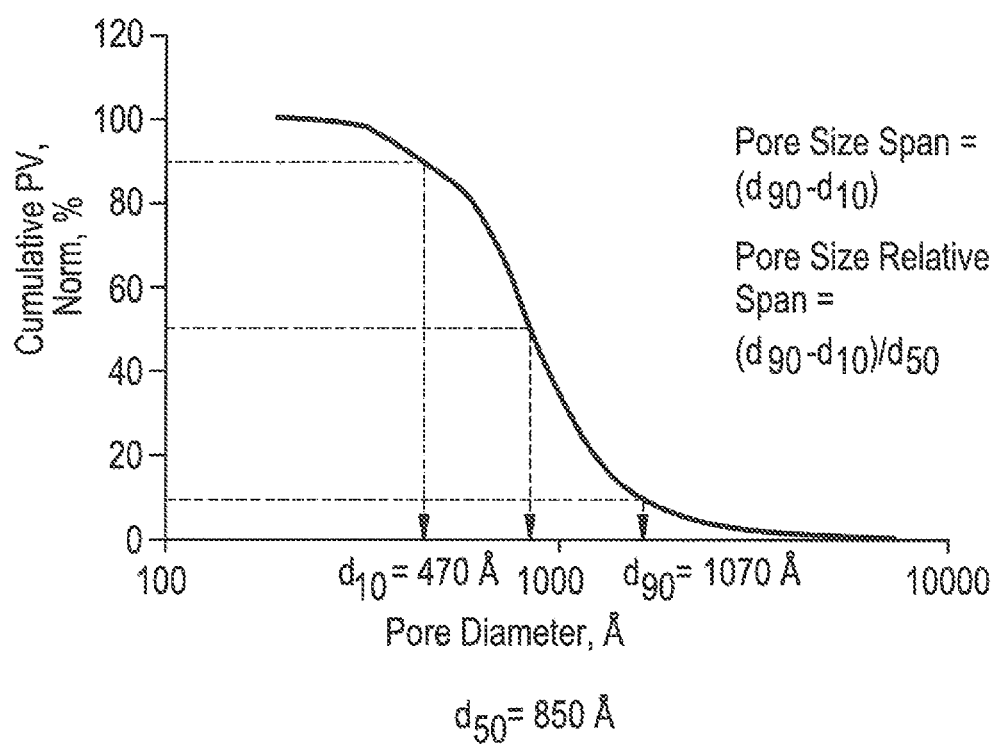
FIG. 4 depicts a graph of pore size distribution of an exemplary embodiment of the chromatography media of the present invention.

Particle size (PS) is defined as median particle size by volume distribution. PS50 represents the middle point particle size at which 50% of particles are smaller than the middle point particle size and 50% are larger than the middle point particle size. Likewise. P590 represents a particle size point at which 90% of particles are smaller and 10% are larger than the particle size point. In some examples, silica gel was utilized having median particle size (PS50) of around 70 μm. Median pore diameter (PD50) is defined as the middle point at which 50% of pore volumes are contributed from smaller pores and 50% are contributed from larger pores. The term "relative span" is defined as meaning a measure of the breadth of pore diameter distribution. The "span" is measured by subtracting the PD10 (i.e., the pore diameter below which 10% of the pore volume resides) from the PD90 pore diameter (i.e., the pore diameter below which 90% by pore volume resides) as measured by mercury porosimetry. The term "relative span" is defined as the ratio of (PD90–PD10)/PD50 (FIG. 4).

The silica gels were prepared using the following procedure: 190 g of a 19% sulfuric acid solution was placed in a reactor equipped with an overhead stirrer and chilled to 5° C. Separately, 263 g of a solution of sodium silicate (22.9 wt % $SiO_2$) was also chilled to 5° C. Subsequently, the sodium silicate solution was added to the sulfuric acid solution via a pump at such a rate as to add the full quantity of silicate in 15 minutes. During the addition the temperature was maintained at 5° C. After the addition was completed, the reactor was warmed to room temperature and the contents were allowed to gel without stirring. Upon gelation, the gel mass was cut in small pieces and submerged in water, in order to remove the sodium sulfate formed during the reaction. The level of sodium sulfate remaining in the material was periodically checked, as wash water was drained and fresh water was added to the gel. When the level fell below 1% the gel was suspended in water and the pH of the liquid was adjusted to a pH=9.7 and the solution heated to 67° C. The temperature was maintained for 20 hours and 20 minutes. At the end of the heating period the gel was recovered by filtration and dried in a 160° C. oven until the moisture content of the gel was less than about 5% by weight.

The silica gel thus obtained had a nitrogen BET surface area of 325 $m^2$/g and a nitrogen pore volume of 1.24 ml/g. Assuming cylindrical pores and using the equation: Pore Diameter (Angstroms)=40000× PV/SA, this material exhibited a pore size as discussed above. Subsequently, the gel is milled to the desired particle size (70 microns) using an ACM and then hydrothermally treated in an autoclave at 300° C. until the desired pore diameter is achieved.

Elemental analysis of carbon content was conducted using a LECO Carbon Analyzer SC-632 available from LECO Corp. The purity of the silica was measured by inductively coupled plasma (ICP) using an ICPE-9000 available from Shimadzu Corp.

The pore diameter distribution of the silica gel particles of the present invention was examined by the methods set forth herein.

The dynamic binding capacity was determined by packing chromatography media (slurried in 100 mM NaCl solution) into a 0.66 cm diameter Omnifit column (Kinesis USA) with a final bed height of 10 cm. A 2.0 mg/ml human polyclonal IgG (hIgG) solution (commercially available from Sigma Aldrich Corporation) in 10 mM Phosphate Buffered Saline (PBS) buffer (pH 7.4) was loaded onto the column at linear a flow velocity of 200 cm/hr using a AKTA Explorer FPLC system from GE Healthcare (GEHC). Breakthrough of the hIgG was measured by UV-Vis signal at 280 nm using a UV900 (GEHC) and chromatograms were recorded and plotted with Unicorn software from GEHC. Dynamic capacity was determined at 5% breakthrough after correcting for the unbound IgG3 flow through fraction and system hold up volume.

Large columns (2.2×20 $cm^2$ or 20 ml) were used to evaluate pressure drop (back pressure) of the columns packed with modified porous inorganic materials. Typically the pressures were obtained at 1000 cm/h linear velocity of 100 mM NaCl solution in deionized water with the AKTA system.

The amount of surface protein binding non-specific to the Protein A ligand interaction was determined by interacting the Protein A derivitized silica with Streptavidin Protein conjugated to Horseradish peroxidase enzyme (HRP) (available commercially from Life Technologies) 100 μl of Protein A Silica was mixed with 83 ng of Streptavidin-HRP in a phosphate saline buffer (PBS), pH 7.5 at ambient temperature for 30 minutes. The sample was washed repeatedly with PBS to remove residual Streptavidin-HRP from the solution. Dilutions of Streptavidin-HRP were prepared separately for use as standards. Tetramethylbenzidine HRP substrate (TMB) (available from Life Technologies) was added to prepared samples and standards and incubated at ambient temperature for 4 minutes while mIxing. The reaction was stopped by addition of IN Phosphoric acid. The amount of Streptavidin-HRP remaining in each sample was determined by measuring substrate conversion to the oxidized form at a wavelength of 450 nm using a Molecular Devices SpectraMax M2 microplate reader using the prepared standard curie. Initial bonded (prior to protein A bonding) materials were also checked for non-specific protein binding of HRP protein with similar procedures as described.

General Process Description for Bonding Silica

Linker Bonding (Initial Bonding): Samples of functionalized porous silica particles were prepared by treating the silica particles with (3-glycidoxypropyl)trimethoxysilane (commercially available from Sigma Aldrich Corporation or Gelest Inc.). A round bottom flask charged with porous silica, and the amount of (3-glycidoxypropyl)-trimethoxysilane was added into the flask. The mixture was allowed to roll overnight at room temperature. Then the silica was soaked with 1 M sulfuric add for 30 minutes, and filtered. It was then washed with DI water five times, filtered, and dried at 70° C. overnight. The resulting samples were submitted for elemental analysis (LECO) for the percentage of carbon on silica, respectively. The calculation of functionalized surface comprising the linker molecules was based on C % with formula below:

$$\text{Linker Molecule (e.g., } Diol\text{) Content} = \frac{C\% * 1{,}000{,}000}{100 * 6 * 12} \; (\mu mol/g)$$

$$\text{Linker Molecule Density} = \frac{C\% * AN}{100 * 6 * 12 * SA * 1E18} \; (\text{number of molecules per nm}^2 \text{ of surface})$$

Whereas AN=Avogadro's Number=$6.022 \times 10^{23}$ (molecules per mole)
SA=Surface Area (in m$^2$/g)
nm=nanometer ($10^{-9}$ meter)

Figure 3:
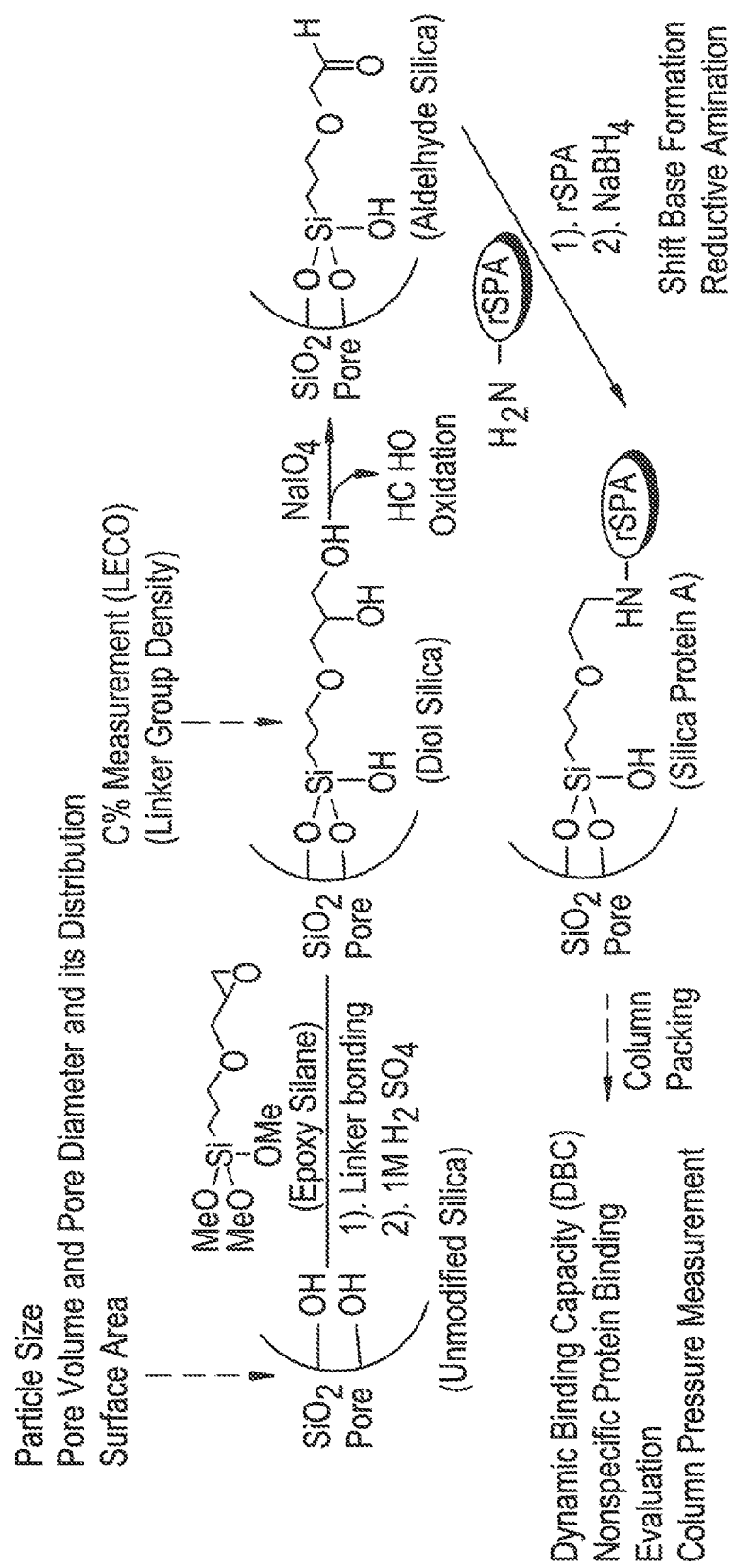
FIG. 3 depicts a reaction scheme of an exemplary embodiment of the chromatography media of the present invention.

Protein A was immobilized to the functionalized silica particles using a well known chemistry (e.g., WO19900923) involving oxidation of surface diol groups with NaIO$_4$ to yield an aldehyde, followed by Shiff base formation of free amine groups on the Protein A chain with the surface aldehyde groups (Protein A was a recombinant Protein A obtained from Repligen Bioprocessing under the trade name rSPA). Sodium borohydrate was added to reduce Schiff base (imine) intermediates (Reductive Amination) into stable secondary amine bonds and unreacted aldehydes to alcohol groups. (FIG. 3).

The amount of immobilized Protein A was determined by subtracting the amount of unreacted Protein A from the total amount of Protein A used in the reaction. The concentration of Protein A was measured by UV-Vis at 280 nm with a spectrophotometer.

Examples 1-8

Examples 1-8 demonstrate different amount of surface linker groups and its influence on IgG binding capacity and non-specific protein binding (FIG. 5). In the examples, the same batch of silica gel was used, and all other process conditions were kept the same. The median particle distribution (PS50) of the silica gels were 70 um, median pore diameter (PD50) of the silica was about 1150 Å and the same amount of protein A was incorporated for each sample.

Results for these samples were recorded in Table 1 below:

TABLE 1

Surface Coverage, Dynamic Binding Capacity and Non-Specific Protein Binding Results

| | | Linker Bonding | | | Protein A Bonding | |
|---|---|---|---|---|---|---|
| Example ID | C % | Diol Function Content (µmol/g) | Linker Density (# per nm$^2$) | Non-Specific Binding (ng/ml) | Immobilized Protein A (mg/ml) | IgG DBC (mg/ml) |
| 1 | 0.23 | 32 | 0.64 | 32 | 5.7 | 41 |
| 2 | 0.36 | 50 | 1.00 | 24 | 7.7 | 43 |
| 3 | 0.45 | 63 | 1.25 | 11 | 8.3 | 49 |
| 4 | 0.50 | 69 | 1.39 | 4.4 | 8.6 | 50 |
| 5 | 0.58 | 81 | 1.62 | 2.5 | 7.8 | 50 |
| 6 | 0.63 | 88 | 1.76 | 1.9 | 7.7 | 46 |
| 7 | 0.66 | 92 | 1.84 | 1.3 | 8.3 | 44 |
| 8 | 0.88 | 122 | 2.45 | 1.0 | 9.8 | 34 |

Figure 5C:
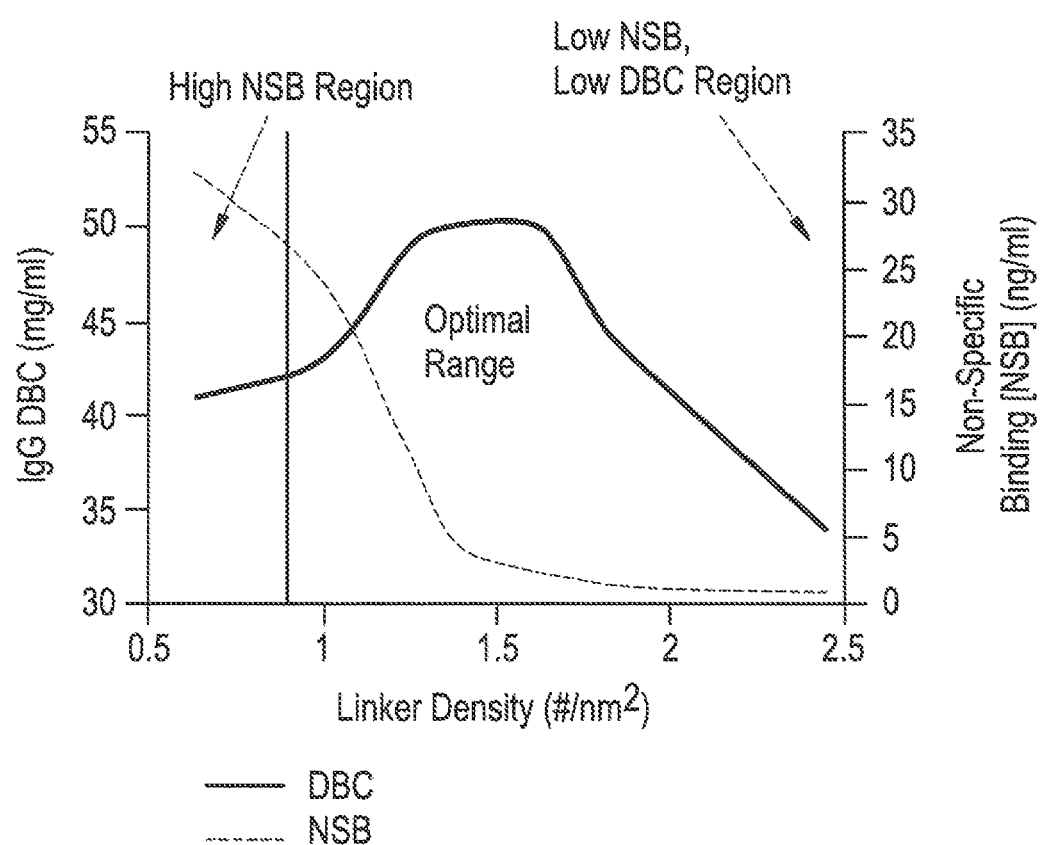
FIG. 5C demostrates the change of non specific binding and dynamic binding capacity with regards to surface linker density used in Examples 1-8.

From Table 1 and FIGS. 5A, 5B and 5C, one can see that the DBC started to decrease as linker population is over 1.8 On the other hand, non-specific protein bindings for linker bonded materials is much higher with lower amount of linker molecule density.

Comparative Example 1

The unmodified silica gel used in Examples 1-8 was packed in column and the non-specific protein binding was measures. The sample showed a high nonspecific protein binding of about 76 ng/ml.

Examples 9-12

To compare the effects of median pore diameter and pore diameter distribution on IgG binding capacity, median particle size (about 70 µm), silica gel particles were modified using the procedure as described above. The results for Examples 9-12 are shown in Table 2 below:

TABLE 2

Dynamic Binding Capacity Results For Particles Having Various Median Pore Diameters and Pore Volume Distributions

| Example ID | Median Pore Diameter (Å) | % PV1 | % PV2 | % PV3 | Total PV (100-10,000 Å) (cc/ml) | Relative SPAN | BET Surface Area (m$^2$/g) | C % (Linker bonding) | Linker Density | IgG DBC (mg/ml) |
|---|---|---|---|---|---|---|---|---|---|---|
| 9 | 653 | 52 | 22 | 4 | 1.02 | 1.3 | 43 | 0.61 | 1.70 | 23 |
| 10 | 1071 | 70 | 40 | 19 | 1.09 | 1.1 | 30 | 0.64 | 1.78 | 41 |

TABLE 2-continued

Dynamic Binding Capacity Results For Particles Having Various
Median Pore Diameters and Pore Volume Distributions

| Example ID | Median Pore Diameter (Å) | % PV1 | % PV2 | % PV3 | Total PV (100-10,000 Å) (cc/ml) | Relative SPAN | BET Surface Area (m²/g) | C % (Linker bonding) | Linker Density | IgG DBC (mg/ml) |
|---|---|---|---|---|---|---|---|---|---|---|
| 11 | 1362 | 59 | 38 | 25 | 1.08 | 1.1 | 25 | 0.49 | 1.37 | 35 |
| 12 | 1561 | 42 | 28 | 18 | 1.11 | 1.0 | 18 | 0.42 | 1.17 | 33 |

% PV1 = (Pore Volume from 600-1,600 Å Pores)/(Volume from 100-10,000 Å) (in %)
% PV2 = (Pore Volume from 1,000-1,600 Å Pores)/(Volume from 100-10,000 Å) (in %)
% PV3 = (Pore Volume from 1,200-1,500 Å Pores)/(Volume from 100-10,000 Å) (in %)

FIG. 6 shows the pore distribution for the silica as used in each of Examples 9-12. From Table 2 and FIG. 6, it can be concluded that functionalized porous silica particles (as shown in Example 10) having % PV1, % PV2 and % PV3 of 70%, 40% and 19%, respectively, gave the highest binding capacity of 41 mg/mL.

Examples 13-16

To compare the effects of median particle size on IgG binding capacity and column back pressure, silica gel particles with different median particle size but the same median pore diameter and distribution as Example 10 were modified using the general procedure described above. The results for Examples 13-16 are shown in Table 3 below:

TABLE 3

Median Particle Size Effect on Dynamic Binding Capacity

| Example ID | PS50 (μm) | PS90 (μm) | C % | Linker Density | 5% DBC (mg/ml) | Column Back Pressure (bar @ 1000 cm/h) |
|---|---|---|---|---|---|---|
| 13 | 72 | 113 | 0.59 | 1.6 | 38 | 3.6 |
| 14 | 56 | 78 | 0.56 | 1.6 | 46 | 4.8 |
| 15 | 69 | 97 | 0.52 | 1.5 | 44 | 3.2 |
| 16 | 83 | 127 | 0.56 | 1.6 | 32 | 2.8 |

As shown in Table 3 above, Example 15 with Median particle size of 69 μm provided DBC of over 40 mg/ml and back pressure of less than 4.0 bar at 1000 cm/h linear velocity.

Comparative Examples 24

To compare silica of different median pore diameters, pore volumes, relative span, pore diameter distribution, commercially available silica gel or controlled pore glass particles have been treated with procedures described above for bonding silica and immobilizing protein A. The properties of these silica are listed in Table 4 and the results are summarized in Table 5 below.

TABLE 4

Properties of Silica Gels in Comparative Examples

| Silica | PD50 | PV (ml/g) | Span | % PV1 | % PV2 | % PV3 | Surface Area (m²/g) |
|---|---|---|---|---|---|---|---|
| A | 1523 | 0.81 | 0.68 | 47.9 | 45.7 | 36.4 | 16 |
| B | 657 | 0.74 | 0.86 | 61.6 | 3.7 | 1.2 | 36 |
| C | 1066 | 1.32 | 0.19 | 98.9 | 75.3 | 0.7 | 25 |

% PV1= (Pore Volume from 600-1,600 Å Pores)/(Volume from 100-10,000 Å) (in %)
% PV2 = (Pore Volume from 1,000-1,600 Å Pores)/(Volume from 100-10,000 Å) (in %)
% PV3 = (Pore Volume from 1,200-1,500 Å Pores)/(Volume from 100-10,000 Å) (in %)

In Table 4, Silica A is a silica gel currently being manufactured and sold by Daiso Co. Ltd. under the trade name Daisogel™ SP-2000-40/60. This silica has particle size range of 40-60 μm.

Silica B is a silica gel with currently being manufactured and sold by Fuji Silysia Chemical Ltd. under the trade name Chromatorex® MB800-40/75. This silica has particle size range of 40-75 μm.

Figure 7:
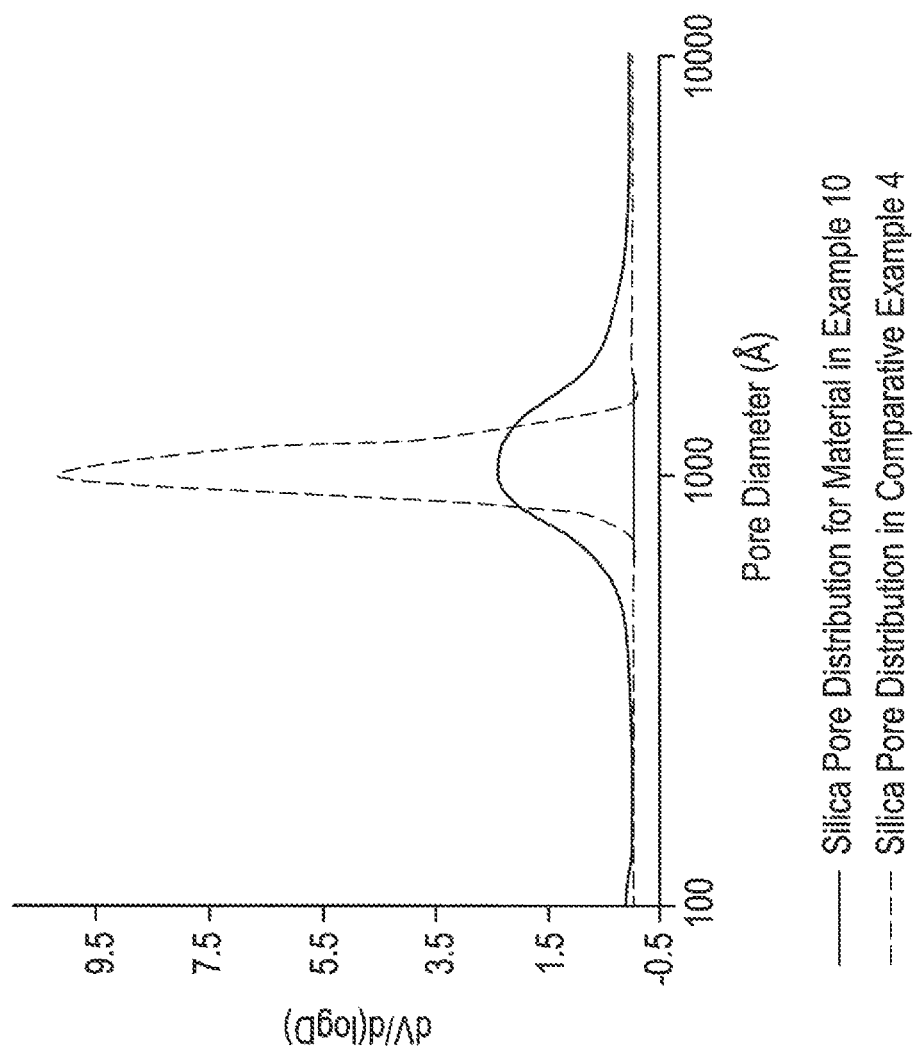
FIG. 7 depicts a comparison of pore size distributions for silica used in Example 10 and in Comparative Example 4.

Silica C is Controlled Pore Glass (CPG®) 1000 particles currently being manufactured and sold by Millipore Ireland Ltd. This silica has an average particle size of about 60 μm. FIG. 7 demonstrates the differences in pore size distribution of Example 10 and Comparative Example 4.

TABLE 5

Results of Comparative Examples with Porous Gels

| Example ID | Silica | C % | Linker Density | Immobilized Protein A (mg/ml) | IgG DBC (mg/ml) |
|---|---|---|---|---|---|
| Comparative 2 | A | 0.17 | 0.9 | 7.4 | 36 |
| Comparative 3 | B | 0.57 | 1.3 | 14.2 | 3.3 |
| Comparative 4 | C | 0.44 | 1.5 | 4.6 | 49 |

While the invention has been described with a limited number of embodiments, these specific embodiments are not intended to limit the scope of the invention as otherwise described and claimed herein. It may be evident to those of ordinary skill in the art upon review of the exemplary embodiments herein that further modifications, equivalents, and variations are possible. AH parts and percentages in the examples, as well as in the remainder of the specification, are by weight unless otherwise specified. Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited. For example, whenever a numerical range with a lower limit, $R_L$, and an upper limit $R_U$, is disclosed, any number R falling within the range is specifically disclosed. In particular, the following numbers R within the range are specifically disclosed: $R=R_L+k(R_U-R_L)$, where k is a variable ranging from 1% to 100% with a 1% increment, e.g., k is 1%, 2%, 3%, 4%, 5%, ... 50%, 51%, 52% .... 95%, 96%, 97%, 98%, 99%, or 100%. Moreover, any numerical range represented by any two values of R, as calculated above is also specifically disclosed. Any modifications of the invention, in addition to those shown and described herein, will become apparent to those skilled in the art from the foregoing description and accompanying drawings. Such modifications are intended to fall within the scope of the appended claims. All publications cited herein are incorporated by reference in their entirety.

What is claimed is:

1. Chromatography media comprising: porous inorganic particles having a median pore diameter of from 600 Å to 1600 Å; a pore size distribution relative span of at least 1.0 up to 2.0; a pore size distribution such that at least 40% of a total pore volume of said porous inorganic particles comprises pores in a diameter range of from 600 Å to 1600 Å; and a functionalized surface comprising an average of from greater than 1 to 2.5 linker molecules per square nanometer of surface area of said porous inorganic particles.

2. Chromatography media comprising: porous silica particles having a median pore diameter of from 600 Å to 1600 Å; a pore size distribution relative span of at least 1.0 up to 2.0; at least 40% of the total pore volume is in pores having a diameter between 600 Å to 1600 Å; and a functionalized surface comprising a protein covalently bonded to surface portions of said porous silica particles, said protein having a molecular weight ranging from 10,000 to 100,000 D, wherein said protein is covalently bonded to surface portions of said porous silica particles via an average of greater than 1.3 to 2.5 linker molecules per square nanometer of surface area of said porous silica particles.

3. Chromatography media comprising: porous silica particles having an average BET surface area of from about 20 m²/g to 100 m²/g; an average pore volume of at least 1 ml/g; a pore size distribution relative span of at least 1.0 up to 2.0; at least 40% of the total pore volume is in pores having a diameter between 600 Å to 1600 Å; a functionalized surface comprising an average of from greater than 1.3 to 2.5 linker molecules per square nanometer of surface area of said porous inorganic particles; and a protein covalently bonded to at least some of said linker molecules, said protein having a molecular weight ranging from 10,000 to 100,000 D, wherein said chromatography media, when used in an affinity column, (i) has a non-specific protein binding level of less than 20.0 ng/ml, and (ii) has a dynamic binding capacity of at least 30 mg/ml.

4. The chromatography media of claim 1, wherein said porous inorganic particles have a pore size distribution relative span of from 1.0 to 1.3.

5. The chromatography media of claim 1, wherein (i) at least 20% of the total pore volume is in pores having a diameter ranging from 1000 Å to 1600 Å, and (ii) at least 15% of the total pore volume is in pores having a diameter ranging from 1200 Å to 1500 Å.

6. The chromatography media of claim 1, wherein said porous inorganic particles have an average BET surface area of greater than 10 m²/g.

7. The chromatography media of claim 1, wherein said porous inorganic particles have an average pore volume of at least 1 ml/g.

8. The chromatography media of claim 7, wherein said porous inorganic particles have an average particle dimension of from 30 µm to 120 µm.

9. The chromatography media of claim 1, wherein said porous inorganic particles comprise silica, alumina, zirconia, or mixtures thereof.

10. The chromatography media of claim 1, wherein said functionalized surface comprises a reaction product resulting from a reaction between (i) hydroxyl groups on said porous inorganic particles and (ii) a silane.

11. The chromatography media of claim 1, wherein (a) each of said linker molecules comprises a diol and (b) said functionalized surface comprises (i) a diol group and (ii) unreacted hydroxyl groups on said porous inorganic particles.

12. The chromatography media of claim 11, wherein said diol is present in an amount ranging from 30 to 150 µmol/g of said porous inorganic particles.

13. The chromatography media of claim 1, wherein each of said linker molecules comprises an aldehyde.

14. The chromatography media of claim 1, wherein said functionalized surface comprises a protein covalently linked to surfaces of said porous inorganic particles via at least one of said linker molecules.

15. The chromatography media of claim 2, wherein said functionalized surface comprises (i) said protein covalently linked to surface portions of said porous silica particles via at least one of said linker molecules and (ii) unreacted hydroxyl groups on said porous silica particles.

16. The chromatography media of claim 2, wherein said protein comprises Protein A, and said protein is present in an amount ranging from 4.0 to 9.8 mg/ml of said porous silica particles.

17. The chromatography media of claim 16, wherein said chromatography media, when used in an affinity column, (i) has a non-specific protein binding level of less than 20.0 ng/ml, and (ii) has a dynamic binding capacity of at least 30 mg/ml.

18. Chromatography media comprising: porous inorganic particles having a median pore diameter of from 600 Å to 1600 Å; a pore size distribution relative span of at least 1.0 up to 2.0; a pore size distribution such that (i) at least 20% of a total pore volume of said porous inorganic particles comprises pores in a diameter range of from 1000 Å to 1600 Å, and (ii) at least 15% of the total pore volume of said porous inorganic particles comprises pores in a diameter range from 1200 Å to 1500 Å; and a functionalized surface.

19. The chromatography media of claim 18, wherein the functionalized surface comprises an average of from greater than 1.3 to 2.0 linker molecules per square nanometer of surface area of said porous inorganic particles.

20. The chromatography media of claim 2, wherein (i) at least 20% to 60% of the total pore volume is in pores having a diameter ranging from 1000 Å to 1600 Å, and (ii) 15% to 30% of the total pore volume is in pores having a diameter ranging from 1200 Å to 1500 Å.

21. The chromatography media of claim 1, wherein said porous inorganic particles comprise silica particles.

22. The chromatography media of claim 18, wherein said porous inorganic particles comprise silica particles.

23. The chromatography media of claim 18, wherein said functionalized surface comprises (i) a protein covalently linked to surface portions of said porous inorganic particles via at least one linker molecule and (ii) unreacted hydroxyl groups on said porous inorganic particles.

24. The chromatography media of claim 23, wherein said protein comprises Protein A, and said protein is present in an amount ranging from 4.0 to 9.8 mg/ml of said porous inorganic particles.

25. The chromatography media of claim 24, wherein said chromatography media, when used in an affinity column, (i) has a non-specific protein binding level of less than 20.0 ng/ml, and (ii) has a dynamic binding capacity of at least 30 mg/ml.

26. The chromatography media of claim 14, wherein said protein comprises Protein A, and said protein is present in an amount ranging from 4.0 to 9.8 mg/ml of said porous inorganic particles.

27. The chromatography media of claim 26, wherein said chromatography media, when used in an affinity column, (i) has a non-specific protein binding level of less than 20.0 ng/ml, and (ii) has a dynamic binding capacity of at least 30 mg/ml.

28. The chromatography media of claim 27, wherein said porous inorganic particles comprise silica particles.

29. The chromatography media of claim 25, wherein said porous inorganic particles comprise silica particles.

* * * * *